(12) United States Patent
Takashita et al.

(10) Patent No.: US 8,154,825 B2
(45) Date of Patent: Apr. 10, 2012

(54) MAGNETIC RECORDING HEAD AND MAGNETIC RECORDING DEVICE

(75) Inventors: Masahiro Takashita, Yokohama (JP); Hitoshi Iwasaki, Yokosuka (JP); Kenichiro Yamada, Tokyo (JP); Junichi Akiyama, Kawasaki (JP); Masayuki Takagishi, Kunitachi (JP); Tomomi Funayama, Tokorozawa (JP); Mariko Shimizu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 747 days.

(21) Appl. No.: 12/232,391

(22) Filed: Sep. 16, 2008

(65) Prior Publication Data
US 2009/0080105 A1    Mar. 26, 2009

(30) Foreign Application Priority Data
Sep. 25, 2007   (JP) .................... 2007-248047

(51) Int. Cl.
*G11B 5/127*   (2006.01)
(52) U.S. Cl. .......... 360/125.71; 360/324.1; 360/324.11; 360/324.12; 360/125.3
(58) Field of Classification Search .......... 360/125.71, 360/125.3, 318
See application file for complete search history.

(56) References Cited

U.S. PATENT DOCUMENTS

| 4,103,315 A | 7/1978 | Hempstead et al. |
|---|---|---|
| 4,945,528 A | 7/1990 | Crasemann |
| 5,695,864 A | 12/1997 | Slonczewski |
| 5,748,399 A | 5/1998 | Gill |
| 5,768,066 A | 6/1998 | Akiyama et al. |
| 5,898,546 A | 4/1999 | Kanai et al. |
| 5,920,447 A | 7/1999 | Sakata et al. |
| 6,011,664 A | 1/2000 | Kryder et al. |
| 6,153,062 A | 11/2000 | Saito et al. |
| 6,278,576 B1 | 8/2001 | Ogata et al. |
| 6,519,119 B1 | 2/2003 | van der Heijden et al. |
| 6,580,589 B1 | 6/2003 | Gill |
| 6,583,969 B1 | 6/2003 | Pinarbasi |
| 6,621,664 B1 | 9/2003 | Trindade et al. |
| 6,697,231 B1 | 2/2004 | Kikuiri |
| 6,785,092 B2 * | 8/2004 | Covington et al. ...... 360/125.45 |
| 6,809,900 B2 | 10/2004 | Covington |
| 6,927,952 B2 | 8/2005 | Shimizu et al. |
| 6,937,446 B2 | 8/2005 | Kamiguchi et al. |
| 6,977,108 B2 | 12/2005 | Hieda et al. |
| 6,982,845 B2 | 1/2006 | Kai et al. |
| 7,106,555 B2 | 9/2006 | Kikuiri et al. |
| 7,119,990 B2 | 10/2006 | Bajorek et al. |
| 7,145,752 B2 | 12/2006 | Ueda et al. |

(Continued)

FOREIGN PATENT DOCUMENTS

JP   64-070947   3/1989

(Continued)

OTHER PUBLICATIONS

Takeo et al., U.S. Appl. No. 12/196,628, filed Aug. 22, 2008.

(Continued)

*Primary Examiner* — Tan T. Nguyen
(74) *Attorney, Agent, or Firm* — Nixon & Vanderhye, P.C.

(57) ABSTRACT

It is made possible to provide a magnetic head that can stabilize the high-frequency magnetic field generated from the spin torque oscillator. A magnetic head includes: first and second main magnetic poles; and a spin torque oscillator provided between the first and second main magnetic poles.

21 Claims, 18 Drawing Sheets

U.S. PATENT DOCUMENTS

| | | | |
|---|---|---|---|
| 7,154,707 | B2 | 12/2006 | Watabe et al. |
| 7,256,955 | B2 | 8/2007 | Pokhil et al. |
| 7,397,633 | B2 | 7/2008 | Xue et al. |
| 7,466,525 | B2 | 12/2008 | Hasegawa et al. |
| 7,471,491 | B2 | 12/2008 | Sato et al. |
| 7,473,478 | B2 | 1/2009 | Sbiaa et al. |
| 7,504,898 | B2 | 3/2009 | Fukuzawa et al. |
| 7,532,433 | B2 | 5/2009 | Kawato et al. |
| 7,532,434 | B1 * | 5/2009 | Schreck et al. ............ 360/125.3 |
| 7,593,185 | B2 | 9/2009 | Yazawa |
| 7,616,412 | B2 | 11/2009 | Zhu et al. |
| 7,724,469 | B2 | 5/2010 | Gao et al. |
| 7,764,136 | B2 | 7/2010 | Suzuki |
| 7,791,829 | B2 * | 9/2010 | Takeo et al. ..................... 360/55 |
| 7,808,330 | B2 | 10/2010 | Fukuzawa et al. |
| 7,911,882 | B2 | 3/2011 | Shimazawa et al. |
| 7,957,098 | B2 | 6/2011 | Yamada et al. |
| 2001/0017752 | A1 | 8/2001 | Hoshiya et al. |
| 2002/0006013 | A1 | 1/2002 | Sato et al. |
| 2002/0051330 | A1 | 5/2002 | Heijden et al. |
| 2002/0075595 | A1 | 6/2002 | Sato et al. |
| 2002/0136927 | A1 | 9/2002 | Hieda et al. |
| 2003/0026040 | A1 | 2/2003 | Covington et al. |
| 2003/0090844 | A1 | 5/2003 | Shimizu et al. |
| 2004/0150912 | A1 | 8/2004 | Kawato et al. |
| 2004/0190197 | A1 | 9/2004 | Watabe et al. |
| 2004/0228045 | A1 | 11/2004 | Hasegawa et al. |
| 2005/0023938 | A1 | 2/2005 | Sato et al. |
| 2005/0105213 | A1 | 5/2005 | Takeo et al. |
| 2005/0207050 | A1 | 9/2005 | Pokhil |
| 2005/0219771 | A1 | 10/2005 | Sato et al. |
| 2006/0171051 | A1 | 8/2006 | Wachenschwanz et al. |
| 2006/0198047 | A1 | 9/2006 | Xue et al. |
| 2006/0221507 | A1 | 10/2006 | Sato et al. |
| 2007/0109147 | A1 | 5/2007 | Fukuzawa et al. |
| 2008/0019040 | A1 | 1/2008 | Zhu et al. |
| 2008/0112087 | A1 | 5/2008 | Clinton et al. |
| 2008/0117545 | A1 | 5/2008 | Batra et al. |
| 2008/0129401 | A1 | 6/2008 | Fukuzawa et al. |
| 2008/0137224 | A1 | 6/2008 | Gao et al. |
| 2008/0150643 | A1 | 6/2008 | Suzuki et al. |
| 2008/0218891 | A1 | 9/2008 | Gubbins et al. |
| 2008/0268291 | A1 | 10/2008 | Akiyama et al. |
| 2008/0304176 | A1 | 12/2008 | Takagishi et al. |
| 2009/0052095 | A1 | 2/2009 | Yamada et al. |
| 2009/0059417 | A1 | 3/2009 | Takeo et al. |
| 2009/0059418 | A1 | 3/2009 | Takeo et al. |
| 2009/0059423 | A1 | 3/2009 | Yamada et al. |
| 2009/0080105 | A1 | 3/2009 | Takashita et al. |
| 2009/0080106 | A1 | 3/2009 | Shimizu et al. |
| 2009/0080120 | A1 | 3/2009 | Funayama et al. |
| 2009/0088095 | A1 | 4/2009 | Kayano et al. |
| 2009/0097167 | A1 | 4/2009 | Sato et al. |
| 2009/0097169 | A1 | 4/2009 | Sato et al. |
| 2009/0115541 | A1 | 5/2009 | Persson et al. |
| 2009/0225465 | A1 | 9/2009 | Iwasaki et al. |
| 2009/0257151 | A1 | 10/2009 | Zhang et al. |
| 2009/0262457 | A1 | 10/2009 | Rivkin et al. |
| 2010/0007992 | A1 * | 1/2010 | Yamada et al. ............... 360/244 |
| 2010/0134922 | A1 * | 6/2010 | Yamada et al. .......... 360/123.01 |

FOREIGN PATENT DOCUMENTS

| | | |
|---|---|---|
| JP | 05-20635 | 1/1993 |
| JP | 07-244801 | 9/1995 |
| JP | 2002-100005 | 4/2002 |
| JP | 2002-208744 | 7/2002 |
| JP | 2002-279616 | 9/2002 |
| JP | 2004-295987 | 10/2004 |
| JP | 2005-108315 | 4/2005 |
| JP | 2005-525663 | 8/2005 |
| JP | 2005-285242 | 10/2005 |
| JP | 2006-209960 | 8/2006 |
| JP | 2006-209964 | 8/2006 |
| JP | 3833512 | 10/2006 |
| JP | 2007-012264 | 1/2007 |
| JP | 2007-124340 | 5/2007 |
| JP | 2007-184923 | 7/2007 |
| JP | 2007-193906 | 8/2007 |
| JP | 2008-123669 | 5/2008 |
| KR | 1020030039289 | 5/2003 |
| WO | 2006-101040 | 9/2006 |

OTHER PUBLICATIONS

Iwasaki et al., U.S. Appl. No. 12/232,014, filed Sep. 9, 2008.
Shimizu et al., U.S. Appl. No. 12/232,469, filed Sep. 17, 2008.
Yamada et al., U.S. Appl. No. 12/780,269, filed May 13, 2010.
X. Zhu and J.-G. Zhu, "Bias-Field-Free Microwave Oscillator Driven by Perpendicularly Polarized Spin Current," IEEE Trans. Magn. vol. 42, p. 2670 (2006).
The Magnetic Recording Conference (TMRC2007), B6 "Micromagnetic Assisted Magnetic Recording (MAMR)"; Jian-Gang Zhu and Xiaochun Zhu on May 21, 2007.
U.S. Appl. No. 12/155,473.
U.S. Appl. No. 12/155,329.
U.S. Appl. No. 12/153,490.
Akiyama et al., U.S. Appl. No. 12/109,760, filed Apr. 25, 2008.
Takeo et al., U.S. Appl. No. 12/196,841, filed Aug. 22, 2008.
Funayama et al., U.S. Appl. No. 12/232,392, filed Sep. 16, 2008.

* cited by examiner

MOVING DIRECTION OF
MAGNETIC RECORDING MEDIUM

MOVING DIRECTION OF
MAGNETIC RECORDING MEDIUM

MAGNETIC RECORDING HEAD AND MAGNETIC RECORDING DEVICE

CROSS-REFERENCE TO RELATED APPLICATION

This application is based upon and claims the benefit of priority from prior Japanese Patent Application No. 2007-248047 filed on Sep. 25, 2007 in Japan, the entire contents of which are incorporated herein by reference.

BACKGROUND OF THE INVENTION

1. Field of the Invention

The present invention relates to a magnetic recording head that has a spin torque oscillator suitable for data storage with a high recording density, a high recording capacity, and a high data transmission rate, and a magnetic recording device equipped with the magnetic recording head.

2. Related Art

In the 1990's, the recording density and capacity of HDDs (Hard Disk Drives) dramatically increased, with MR (Magneto-Resistive effect) heads and GMR (Giant Magneto-Resistive effect) heads being put into practical use. However, the problems of thermal fluctuations of magnetic recording media became apparent in the early 2000's, and the increase of the recording density temporarily slowed down. In 2005, perpendicular magnetic recording that was more suitable for high-density recording in principle than for longitudinal magnetic recording was put into practical use. This invention has become the driving force and since then, the HDD recording density has been increasing at an annual rate of approximately 40%.

The latest examinations on the recording density show that the recording density of 400 Gbits/inch$^2$ has been reached. If the growth continues strong at this rate, the recording density of 1 Tbits/inch$^2$ will be achieved around the year 2012. However, achieving such a high recording density is not easy by the perpendicular magnetic recording method, because the problem of thermal fluctuations rearises.

To counter this problem, a "microwave assisted magnetic recording method" has been suggested. By the microwave assisted magnetic recording method, a high-frequency magnetic field at a frequency in the neighborhood of the resonant frequency of a magnetic recording medium, which is much higher than the recording signal frequency, is locally applied. As a result, the magnetic recording medium resonates, and the coercivity Hc of the magnetic recording medium having the high-frequency magnetic field applied thereto decreases to half the original value. Therefore, a high-frequency magnetic field is overlapped with the recording magnetic field, so that magnetic recording can be performed on a magnetic recording medium having higher coercivity Hc and greater magnetic anisotropic energy Ku (see U.S. Pat. No. 6,011,664, for example). However, according to U.S. Pat. No. 6,011,664, a high-frequency magnetic field is generated with a coil, and it is difficult to efficiently apply a high-frequency magnetic field at the time of high-density recording.

To counter this problem, a method of utilizing a spin torque oscillator as the means of generating a high-frequency magnetic field has been suggested (see United States Patent Application Publication No. 2005/0023938, for example). According to United States Patent Application Publication No. 2005/0023938, the spin torque oscillator is formed with a spin injection layer, a nonmagnetic layer, a magnetic layer, and an electrode layer. When a direct current is applied to the spin torque oscillator through the electrode layer, the magnetization of the magnetic layer has ferromagnetic resonance due to a spin torque generated from the spin injection layer. As a result, a high-frequency magnetic field is generated from the spin torque oscillator.

Since a spin torque oscillator is several tens of nanometers in size, a high-frequency magnetic field is generated at a proximity of several tens of nanometers from the spin torque oscillator. Accordingly, a perpendicular magnetic recording medium can resonate effectively by virtue of the in-plane component of the high-frequency magnetic field, and the coercivity of the magnetic recording medium can be greatly reduced. As a result, high-density magnetic recording can be performed only on the overlapping portion between the recording magnetic field generated from the main magnetic pole and the high-frequency magnetic field generated from the spin torque oscillator, and a magnetic recording medium with high coercivity Hc and large magnetic anisotropic energy Ku can be used. Thus, the problem of thermal fluctuations during a high-density recording operation can be avoided.

In a high-frequency assisted recording operation, however, the recording magnetic field generated from the main magnetic pole is applied to the spin torque oscillator, and the frequency of the high-frequency magnetic field generated from the spin torque oscillator fluctuates. Because of this, a high-frequency magnetic field having a constant frequency cannot be obtained, and stable magnetic recording cannot be performed.

SUMMARY OF THE INVENTION

The present invention has been made in view of these circumstances, and an object thereof is to provide a magnetic head that can stabilize the high-frequency magnetic field generated from the spin torque oscillator, and a magnetic recording device equipped with the magnetic head.

A magnetic head according to a first aspect of the present invention includes: first and second main magnetic poles; and a spin torque oscillator provided between the first and second main magnetic poles.

A magnetic recording device according to a second aspect of the present invention includes: the magnetic head according to the first aspect, wherein writing on a magnetic recording medium performs with the use of the magnetic head.

DESCRIPTION OF THE PREFERRED EMBODIMENTS

The following is a description of embodiments of the present invention, with reference to the accompanying drawings.

First Embodiment

Figure 1:
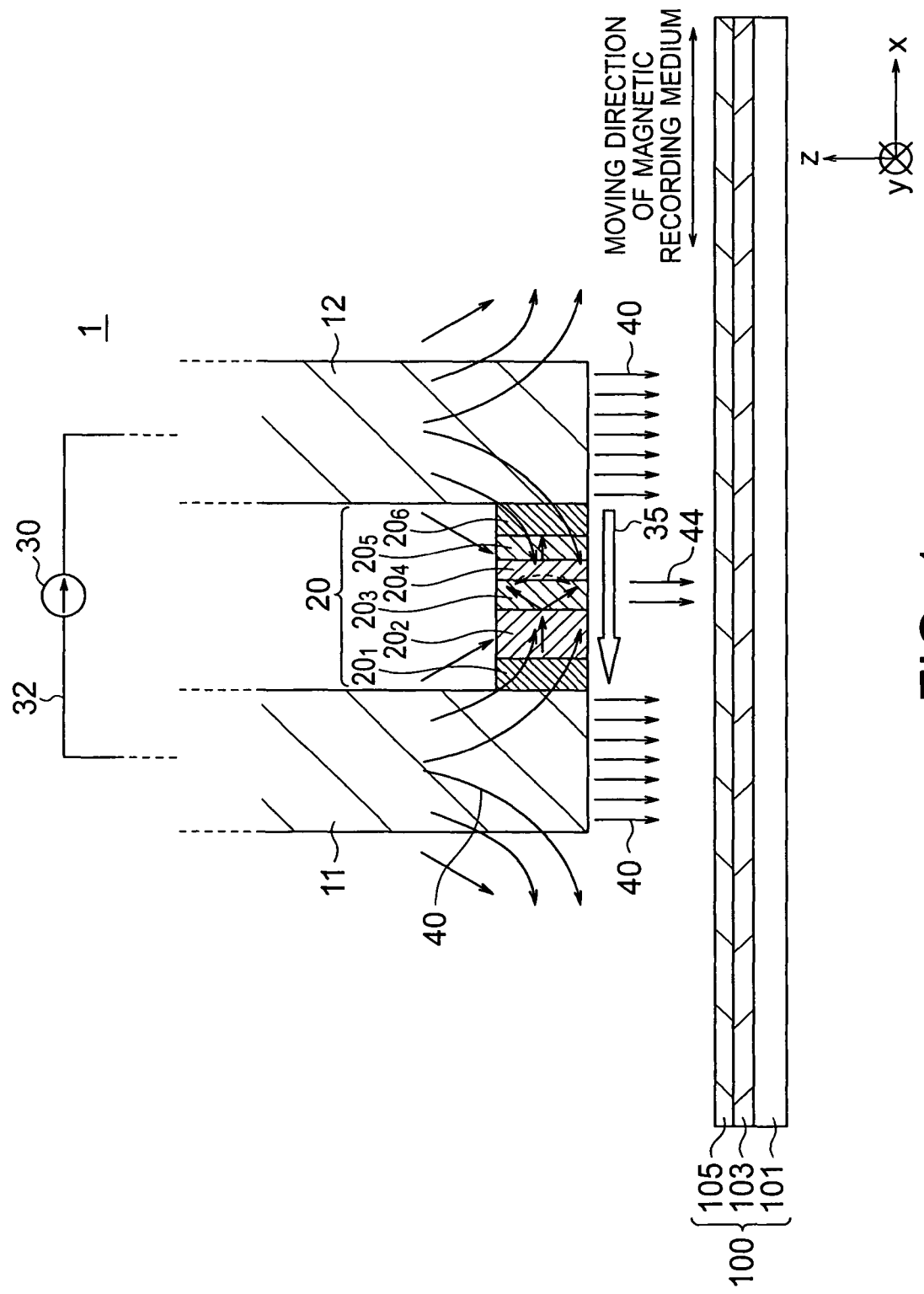
FIG. 1 is a cross-sectional view of a magnetic head according to a first embodiment.

FIG. 1 shows a magnetic head in accordance with a first embodiment of the present invention. FIG. 1 is a cross-sectional view of the magnetic head 1, taken along a plane in a direction that is parallel to the moving direction of a magnetic recording medium 100 and is perpendicular to a plane facing the magnetic recording medium 100. As shown in FIG. 1, the moving direction of the magnetic recording medium 100 is toward the left-hand side or the right-hand side in the drawing.

The magnetic head 1 of this embodiment includes: main magnetic poles 11 and 12 that are arranged in the moving direction of the magnetic recording medium 100, and generate recording magnetic fields 40; a spin torque oscillator 20 that is provided between the main magnetic poles 11 and 12 and is located on the side of the magnetic recording medium 100; and a driving current source 30 that applies a driving current to the spin torque oscillator 20 via the main magnetic poles 11 and 12. The driving current source 30 is electrically connected to the main magnetic poles 11 and 12 with a wire 32. The driving current source 30 may be replaced with a driving voltage source, as long as predetermined current can be applied to the spin torque oscillator 20.

The magnetic recording medium 100 includes a substrate 101, a soft magnetic layer 103 placed on the substrate 101, and a magnetic recording layer 105 placed on the soft magnetic layer 103. It is preferable that the magnetic recording layer 105 is made of a material on which perpendicular magnetic recording can be performed.

The spin torque oscillator 20 includes an electrode $20_1$, a bias layer (the third magnetic layer) $20_2$, an oscillation layer (the second magnetic layer) $20_3$, an intermediate layer $20_4$, a spin injection layer (the first magnetic layer) $20_5$, and an electrode $20_6$. The electrode $20_1$ is electrically connected to the main magnetic pole 11, and the electrode $20_6$ is electrically connected to the main magnetic pole 12. The electrodes $20_1$ and $20_6$ are made of a material that has low electric resistance and is not easily oxidized, such as Ti or Cu. However, in a later described structure in which the main magnetic poles also serve as the electrodes of the spin torque oscillator, the driving current is spin-polarized by the material of the main magnetic poles, and a high-frequency magnetic field 44 generated from the spin torque oscillator 20 might become unstable. Therefore, it is preferable that the electrodes $20_1$ and $20_6$ are made of a material that erases spin information, such as Ta or Ru. With this arrangement, the instability can be reduced.

The bias layer $20_2$ and the oscillation layer $20_3$ each include a magnetic film having an axis of easy magnetization that is perpendicular to the film plane. The bias layer $20_2$ serves to fix the magnetization of the oscillation layer $20_3$. The intermediate layer $20_4$ should preferably be made of a nonmagnetic material with a high spin transmission rate, such as Cu, Ag, or Au. The spin injection layer $20_5$ includes a magnetic film having an axis of easy magnetization that is perpendicular to the film plane. In this embodiment, the magnetization direction observed where a current is not flowing is the same (parallel) either in the bias layer $20_2$ and the spin injection layer $20_5$. Although the magnetization direction is shown as a rightward direction in FIG. 1, the magnetization direction may be a leftward direction. Even if the magnetization direction is a leftward direction, the driving current direction 35 remains a leftward direction as shown in FIG. 1.

Examples of the materials for the spin injection layer $20_5$, the oscillation layer $20_3$, and the bias layer $20_2$ include:

(1) soft magnetic films each having a relatively high saturation flux density and magnetic anisotropy in a direction parallel to the film plane, such as a CoFe film, a CoNiFe film, a NiFe film, a CoZrNb film, a FeN film, a FeSi film, and a FeAlSi film (suitable as oscillation layers);

(2) CoCr magnetic alloy films each having magnetization oriented in a direction parallel to the film plane;

(3) CoCr magnetic films each having magnetization oriented in a direction perpendicular to the film plane, such as a CoCrPt film, a CoCrTa film, a CoCrTaPt film, and a CoCrTaNb film (suitable as spin injection layers and bias layers);

(4) RE-TM amorphous alloy magnetic films, such as a TbFeCo film (suitable as spin injection and bias layers);

(5) Co artificial lattice magnetic films, such as a Co/Pd film, a Co/Pt film, and a CoCrTa/Pd film (suitable as spin injection layers and bias layers);

(6) materials with excellent vertical alignment, such as CoPt or FePt alloy magnetic films and SmCo alloy magnetic layers (suitable as spin injection layers and bias layers); and (7) alloys that are formed by adding Al, Si, Ge, Mn, or Cr to CoFe (suitable as spin injection layers and bias layers).

Alternatively, to adjust the saturation flux density and the anisotropic magnetic field, the above materials may be stacked to form following each: the spin injection layer $20_5$, the bias layer $20_2$, and the oscillation layer $20_3$. The above materials may also be stacked, with a nonmagnetic layer (preferably made of a noble metal such as Cu, Pt, Au, Ag, Pd, or Ru, or a nonmagnetic transmission metal such as Cr, Rh, Mo, or W) being interposed in between. The resultant stacked structure may be a stacked ferri-structure in which the magnetization directions of the above materials are antiparallel to one another, or a stacked structure in which the magnetization directions of the above materials are parallel to one another.

Alternatively, it is possible to employ a stacked ferri-structure having a nonmagnetic layer (preferably made of Ru in particular) interposed between two magnetic films. It is also possible to employ a stacked structure of a ferromagnetic material and an antiferromagnetic material, utilizing exchange coupling. This is because the magnetization of the spin injection layer $20_5$ can be effectively fixed, so as to increase the oscillation frequency of the oscillation layer $20_3$. Here, examples of the material for the antiferromagnetic layer include FeMn, NiMn, FeNiMn, FeMnRh, RhMn, CoMn, CrMn, CrMnPt, CrMnRh, CrMnCu, CrMnPd, CrMnIr, CrMnNi, CrMnCo, CrMnTi, PtMn, PdMn, PdPtMn, and IrMn. The thickness of the oscillation layer $20_3$ is preferably 5 nm or greater so as to apply a sufficient high-frequency magnetic field to the magnetic recording medium 100, and is preferably 20 nm or smaller so as to achieve a uniform oscillation mode. The thickness of the spin injection layer $20_5$ is preferably 2 nm or greater, so as to restrict the oscillation at the spin injection layer $20_5$.

Next, the operating principles of the spin torque oscillator 20 are described. As the driving current flows, electrons flow from the electrode $20_1$ to the electrode $20_6$. Here, the conduction electrons having spins in the opposite directions from the magnetization direction of the spin injection layer $20_5$ are reflected by the interface between the intermediate layer $20_4$ and the spin injection layer $20_5$. The reflected electrons pass through the intermediate layer $20_4$, and are injected into the oscillation layer $20_3$. The magnetization in the oscillation layer $20_3$ then oscillates to generate the high-frequency magnetic field 44.

Although only one main magnetic pole is provided normally, this embodiment is characterized in that two main magnetic poles are provided, with the spin torque oscillator 20 being interposed between the two main magnetic poles. With the two main magnetic poles, the components parallel to the medium facing plane (the components perpendicular to the film plane of the spin torque oscillator 20) of the recording magnetic fields 40 generated from the main magnetic pole 11 and the main magnetic pole 12 cancel each other. Accordingly, the amount of the recording magnetic fields 40 flowing into the spin torque oscillator 20 is reduced, and the high-frequency magnetic field 44 generated from the spin torque oscillator 20 is stabilized. Particularly, as the high-frequency magnetic field 44 is generated from the oscillation layer $20_3$ of the spin torque oscillator 20, it is essential that the recording magnetic field 40 is canceled in the oscillation layer $20_3$. The length of the spin torque oscillator 20 between the main magnetic pole 11 and the main magnetic pole 12 is approximately 50 nm to 200 nm in the moving direction of the magnetic recording medium 100. If the spin torque oscillator 20 is located as close as possible to the main magnetic poles 11 and 12, the overlapping portion between the high-frequency magnetic field 44 and the recording magnetic fields 40 is larger, and recording can be readily performed on a magnetic recording medium having high coercivity and large magnetic anisotropic energy. It is more preferable that the moving direction of the magnetic recording medium 100 is a rightward or leftward direction with respect to the plane of FIG. 1, compared with a case where the magnetic recording medium 100 moves in a direction perpendicular to the plane of FIG. 1. This is because a greater high-frequency assisting effect can be expected when the portion of the magnetic recording medium 100 having the high-frequency magnetic field 44 applied thereto moves below the main magnetic poles 11 and 12, as long as the moving direction of the magnetic recording medium 100 moves in a leftward or rightward direction with respect to the plane of FIG. 1.

It is particularly preferable that the axis of easy magnetization of the oscillation layer $20_3$ of the spin torque oscillator 20 extends in the same direction as or in the opposite direction from the applying direction of the driving current. This is to avoid adverse influence of a current magnetic field generated by the driving current.

Figure 2:
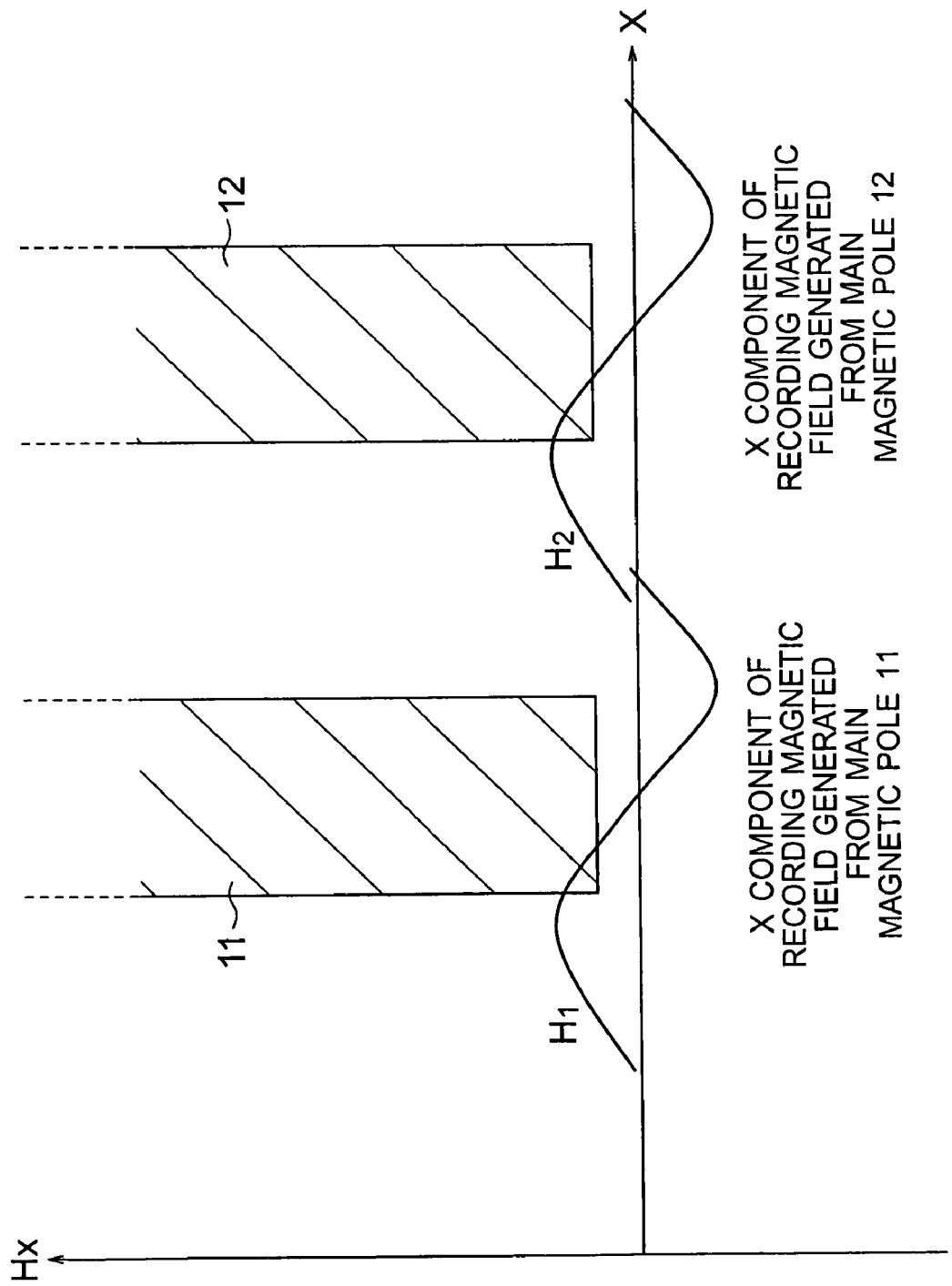
FIG. 2 illustrates the effects of each embodiment.

The essential control elements in the oscillation layer $20_3$ for canceling the recording magnetic fields 40 are now described. FIG. 2 is a schematic view showing the x-direction component Hx of the recording magnetic field 44 generated from the main magnetic pole 11 and the main magnetic pole 12 in the x direction (the horizontal direction) shown in FIG. 1. It is essential that the horizontal components of the recording magnetic fields $H_1$ and $H_2$ of the respective main magnetic poles 11 and 12 are equal to each other in size and cancel each other in the oscillation layer $20_3$. To obtain such a structure, the following relationship (1) needs to be established so that the horizontal component of the recording magnetic field 40 generated from the main magnetic pole 11 and the horizontal component of the recording magnetic field 40 generated from the main magnetic pole 12 cancel each other:

$$Ms_1 \cdot S_1 = Ms_2 \cdot S_2 \qquad (1)$$

where $Ms_1$ represents the saturation magnetization of the main magnetic pole 11, $Ms_2$ represents the saturation magnetization of the main magnetic pole 12, $S_1$ represents the area of the face of the main magnetic poles 11 facing the recording medium, and $S_2$ represents the area of the face of the main magnetic poles 12 facing the recording medium.

In this case, the magnetic fields applied from the main magnetic poles 11 and 12 become as small as possible, if the oscillation layer $20_3$ is placed at the mid point between the main magnetic poles 11 and 12. When the recording magnetic fields generated from the main magnetic pole 11 and the main magnetic pole 12 is unbalanced because the relationship (1) is not established or because of some other aspect, it is not particularly preferable that the oscillation layer $20_3$ is placed at the mid point between the main magnetic poles 11 and 12, and therefore, the location of the oscillation layer $20_3$ needs to be shifted when appropriate.

Figure 3:
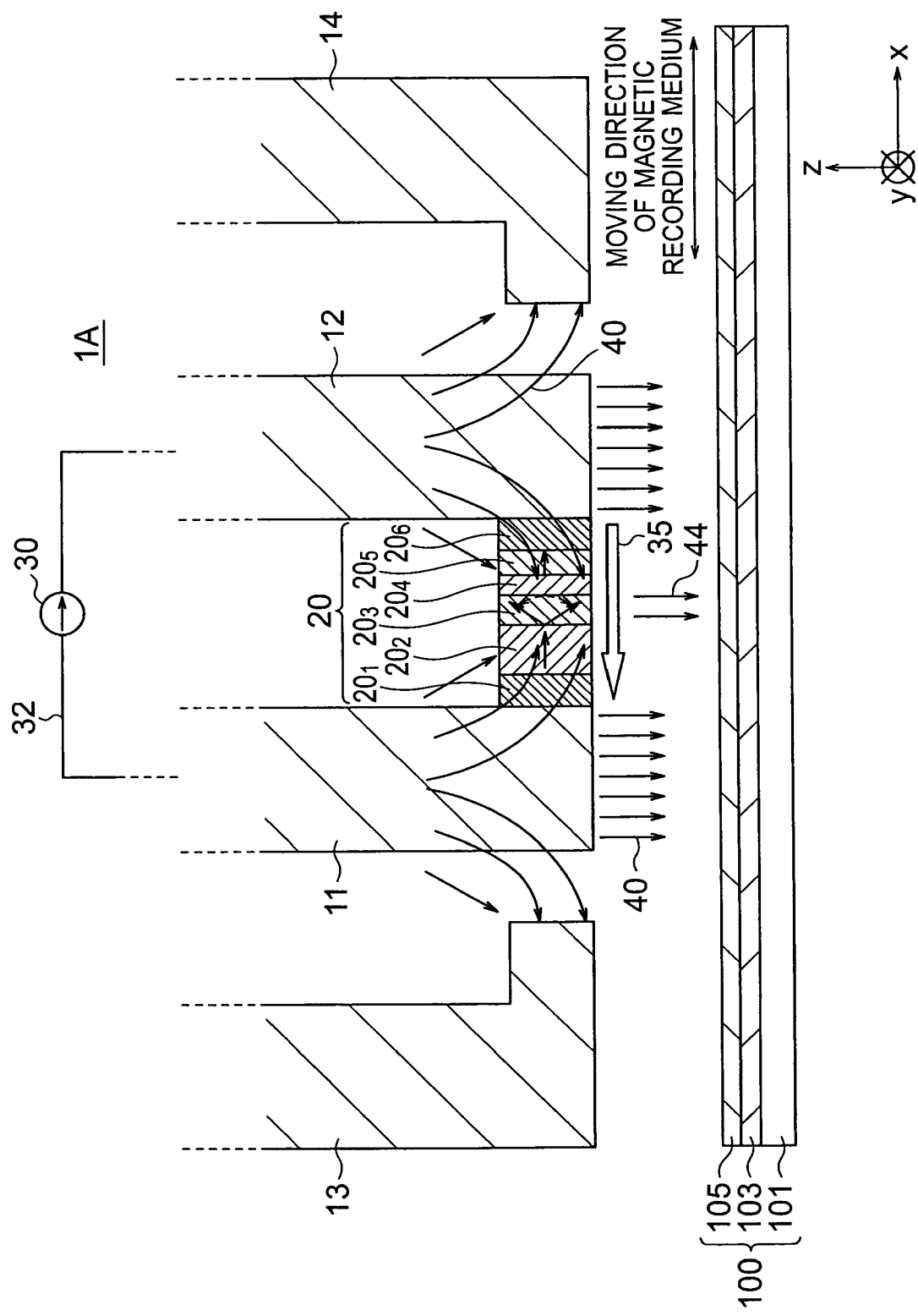
FIG. 3 is a cross-sectional view of a magnetic head according to a modification of the first embodiment.

Next, the shields are described. A magnetic head normally has one shield, and it is possible to employ only one shield in this embodiment. However, if there is only one shield, the recording magnetic fields 40 tend to concentrate on the side of the shield. As a result, it becomes difficult to cancel the recording magnetic fields applied to the spin torque oscillator 20. To solve this problem, it is preferable that two shields 13 and 14 are provided as shown in FIG. 3. FIG. 3 illustrates a magnetic head 1A in accordance with a modification of this embodiment. The shield 13 is placed on the opposite side of the main magnetic pole 11 from the spin torque oscillator 20, and the shield 14 is placed on the opposite side of the main magnetic pole 12 from the spin torque oscillator 20.

Figure 4:
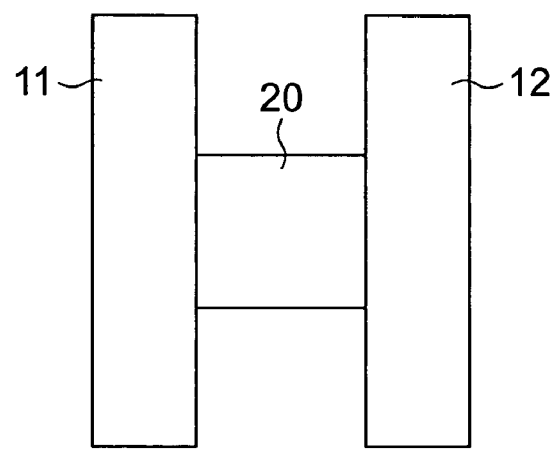
FIG. 4 is a plan view showing a first specific example of the arrangement of the main magnetic poles and the spin torque oscillator according to the first embodiment.

A first specific example of the arrangement of the main magnetic poles and the spin torque oscillator of this embodiment is shown in FIG. 4. FIG. 4 is a plan view of the arrangement, seen from the magnetic recording medium 100. In the first specific example, the main magnetic pole 11 and the main magnetic pole 12 are placed on the opposite side from each other, and the spin torque oscillator 20 is interposed between the main magnetic pole 11 and the main magnetic pole 12.

Figure 5:
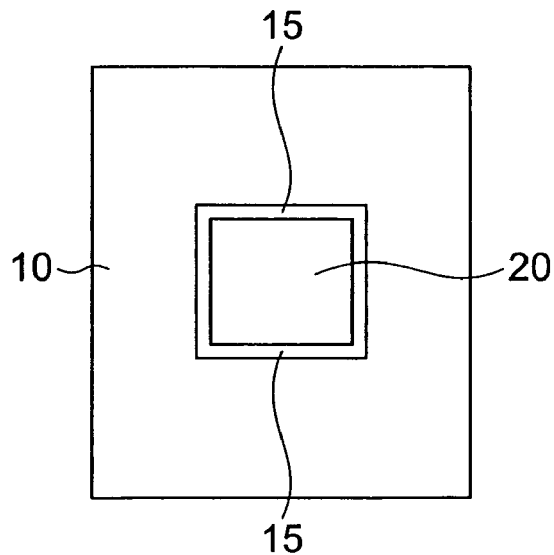
FIG. 5 is a plan view showing a second specific example of the arrangement of the main magnetic poles and the spin torque oscillator according to the first embodiment.

A second specific example of the arrangement of the main magnetic poles and the spin torque oscillator of this embodiment is shown in FIG. 5. FIG. 5 is a plan view of the arrangement, seen from the magnetic recording medium 100. In the second specific example, the main magnetic pole 11 and the main magnetic pole 12 are integrated with each other to form a main magnetic pole 10, and the main magnetic pole 10 is designed to surround the spin torque oscillator 20. In this case, an insulating film 15 is provided on the side faces of the spin torque oscillator 20 (on the side faces that are parallel to the moving direction of the magnetic recording medium).

As described above, in accordance with this embodiment, components of the recording magnetic fields 40 generated from the respective main magnetic poles 11 and 12 cancel each other in a direction perpendicular to the film plan of the spin torque oscillator 20. Accordingly, the amount of recording magnetic fields flowing into the spin torque oscillator 20 is reduced, and the high-frequency magnetic field 44 generated from the spin torque oscillator 20 can be stabilized.

Second Embodiment

Figure 6:
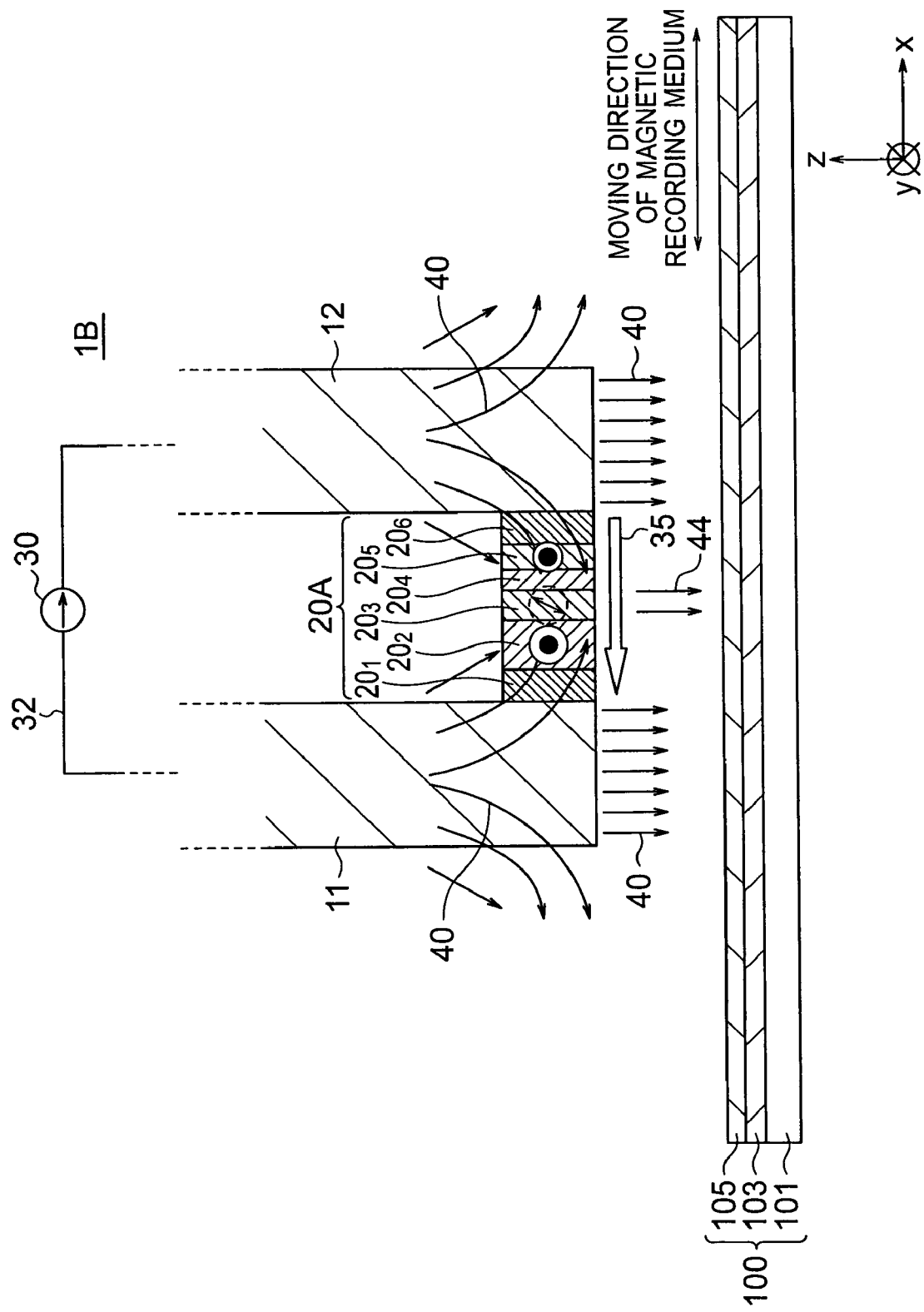
FIG. 6 is a cross-sectional view of a magnetic head according to a second embodiment.

FIG. 6 shows a magnetic head in accordance with a second embodiment of the present invention. FIG. 6 is a cross-sectional view of the magnetic head 1B of this embodiment, taken along a plane in a direction that is parallel to the moving direction of the magnetic recording medium 100 and is perpendicular to a plane facing the magnetic recording medium 100. As shown in FIG. 6, the moving direction of the magnetic recording medium 100 is toward the left-hand side or the right-hand side in the drawing.

The magnetic head 1B of this embodiment is the same as the magnetic head 1 of the first embodiment shown in FIG. 1, except that the spin torque oscillator 20 is replaced with a spin torque oscillator 20A. The spin torque oscillator 20A includes an electrode $20_1$, a bias layer $20_2$, an oscillation layer $20_3$, an intermediate layer $20_4$, a spin injection layer $20_5$, and an electrode $20_6$. Unlike the spin torque oscillator 20 of the first embodiment, the spin torque oscillator 20A of this embodiment has the bias layer $20_2$, the oscillation layer $20_3$, and the spin injection layer $20_5$ magnetized in a direction substantially parallel to the film plane. In the spin torque oscillator 20 of the first embodiment, the magnetization directions of the bias layer $20_2$, the oscillation layer $20_3$, and the spin injection layer $20_5$ are substantially perpendicular to the film plane. In the spin torque oscillator 20A of this embodiment, the bias layer $20_2$, the oscillation layer $20_3$, and the spin injection layer $20_5$ are magnetized forward with respect to the paper plane of FIG. 6, when a current is not flowing. In other words, the magnetization directions are the same (parallel to one other). Alternatively, the magnetization directions may be backward with respect to the paper plane. Further, the magnetization directions may be antiparallel to one another. In that case, however, the driving current direction is reversed.

The operation of the spin torque oscillator 20A in accordance with this embodiment is the same as that in the first embodiment. More specifically, the electrons moved due to the driving current flow from the electrode $20_1$ to the electrode $20_6$. Here, conduction electrons having spins in the opposite direction from the magnetization direction of the spin injection layer $20_5$ are reflected by the interface between the intermediate layer $20_4$ and the spin injection layer $20_5$. The reflected electrons are injected into the oscillation layer $20_3$ through the intermediate layer $20_4$. The magnetization of the oscillation layer $20_3$ then oscillates to generate a high-frequency magnetic field 44.

The same materials as those mentioned in the first embodiment can be used for the bias layer $20_2$, the oscillation layer $20_3$, the spin injection layer $20_5$, and the intermediate layer $20_4$. It is particularly preferable that the bias layer $20_2$ is made of an antiferromagnetic material, so as to stabilize the oscillation frequency.

As in the first embodiment, components of the recording magnetic fields 40 generated from the respective main magnetic poles 11 and 12 cancel each other in a direction perpendicular to the film plane of the spin torque oscillator 20A in this embodiment. Accordingly, the amount of the recording magnetic fields 40 flowing into the spin torque oscillator 20A can be reduced, and the high-frequency magnetic field 44 generated from the spin torque oscillator 20A can be stabilized.

Third Embodiment

Figure 7:
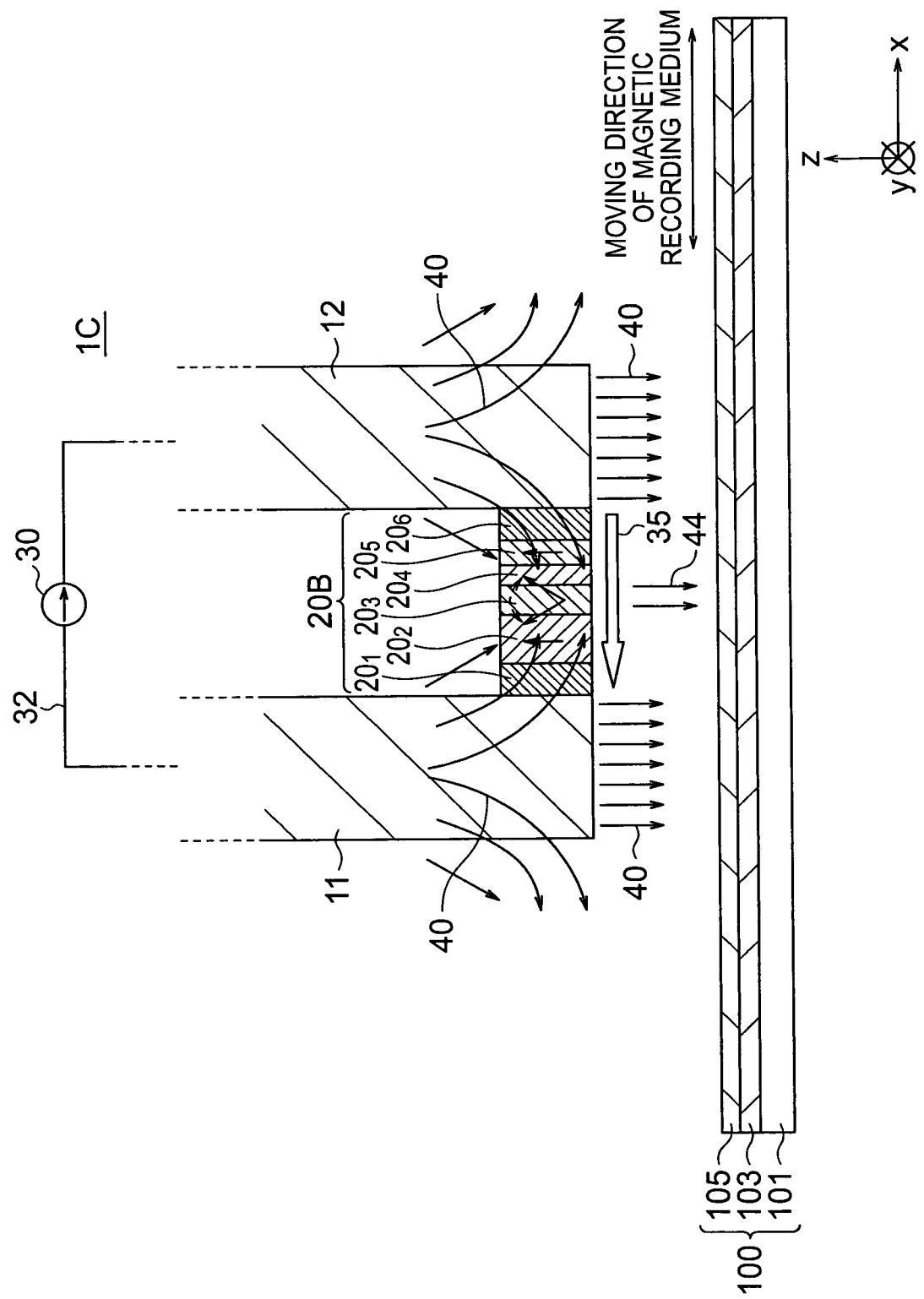
FIG. 7 is a cross-sectional view of a magnetic head according to a third embodiment of the present invention.

FIG. 7 shows a magnetic head in accordance with a third embodiment of the present invention. FIG. 7 is a cross-sectional view of the magnetic head 1C of this embodiment, taken along a plane in a direction that is parallel to the moving direction of the magnetic recording medium 100 and is perpendicular to a plane facing the magnetic recording medium 100. As shown in FIG. 7, the moving direction of the magnetic recording medium 100 is toward the left-hand side or the right-hand side in the drawing.

The magnetic head 1C of this embodiment is the same as the magnetic head 1B of the second embodiment shown in FIG. 6, except that the spin torque oscillator 20A is replaced with a spin torque oscillator 20B. The spin torque oscillator 20B includes an electrode $20_1$, a bias layer $20_2$, an oscillation layer $20_3$, an intermediate layer $20_4$, a spin injection layer $20_5$, and an electrode $20_6$. In the spin torque oscillator 20B of this embodiment, the magnetization directions of the bias layer $20_2$, the oscillation layer $20_3$, and the spin injection layer $20_5$ are substantially parallel to the film plane. In other words, the magnetization directions are the same (parallel to one other). However, the aspect that the magnetization directions are upward directions in FIG. 7 is different from the spin torque oscillator 20A of the second embodiment. Alternatively, the magnetization directions may be downward in FIG. 7. Further, the magnetization directions may be antiparallel to one another. In that case, however, the driving current direction is reversed.

In this embodiment, when the current to be applied to the spin torque oscillator 20B flows from the right side to the left side in FIG. 7, the electrons flow from the left side to the right side in FIG. 7. Electrons having spins in the opposite direction from the magnetization directions of the bias layer $20_2$ and the spin injection layer $20_5$ are reflected by the interface between the intermediate layer $20_4$ and the spin injection layer $20_5$, and are injected into the oscillation layer $20_3$. As a result, the magnetization of the oscillation layer $20_3$ rotates to generate a high-frequency magnetic field 44.

The same materials as those mentioned in the first embodiment can be used for the bias layer $20_2$, the oscillation layer $20_3$, the spin injection layer $20_5$, and the intermediate layer $20_4$. It is particularly preferable that the bias layer $20_2$ is made of an antiferromagnetic material, so as to stabilize the oscillation frequency.

As in the second embodiment, components of the recording magnetic fields 40 generated from the respective main magnetic poles 11 and 12 cancel each other in a direction perpendicular to the film plane of the spin torque oscillator 20B in this embodiment. Accordingly, the amount of the recording magnetic fields 40 flowing into the spin torque oscillator 20B can be reduced, and the high-frequency magnetic field 44 generated from the spin torque oscillator 20B can be stabilized.

Fourth Embodiment

Figure 8:
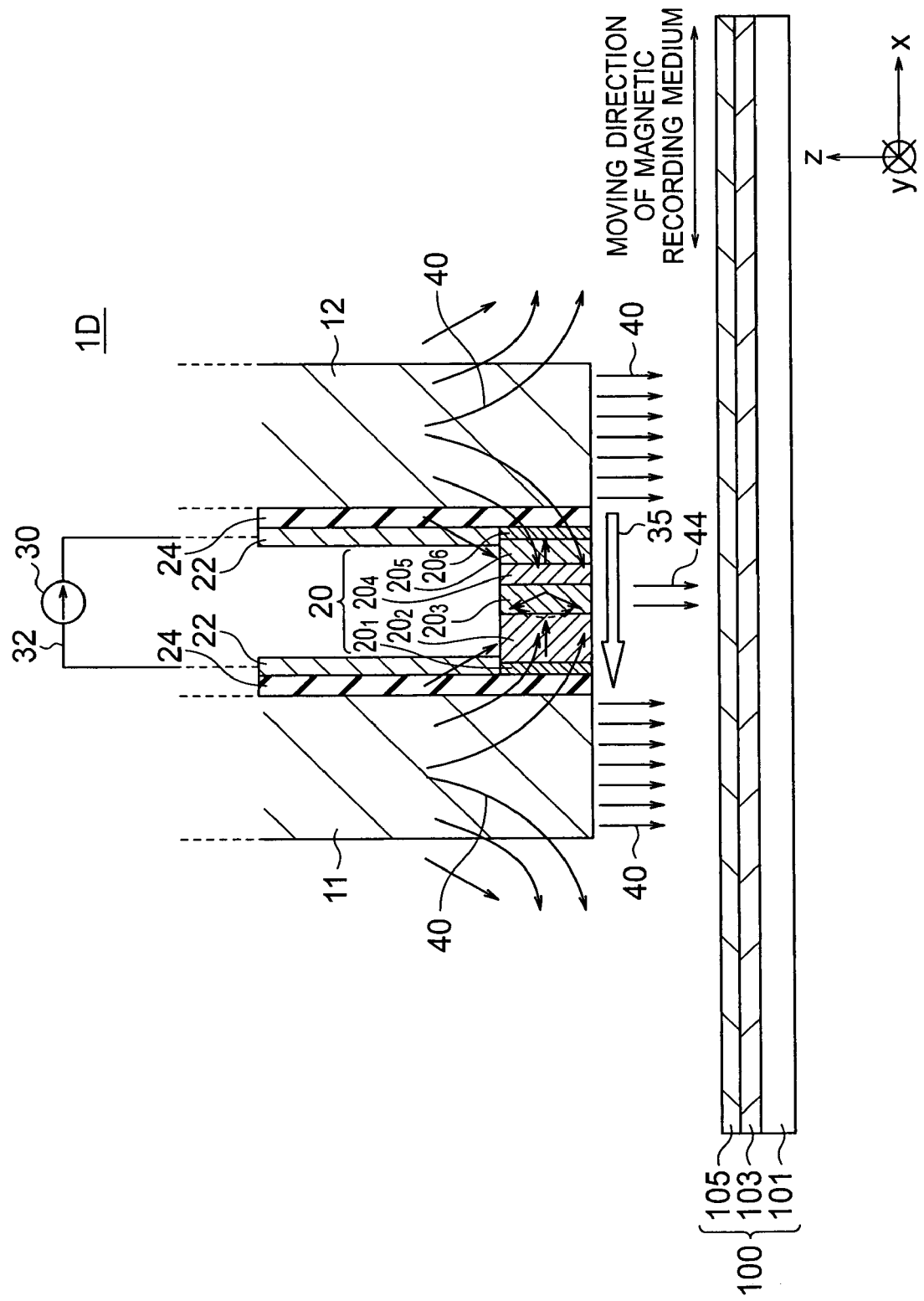
FIG. 8 is a cross-sectional view of a magnetic head according to a fourth embodiment of the present invention.

FIG. 8 shows a magnetic head in accordance with a fourth embodiment of the present invention. FIG. 8 is a cross-sectional view of the magnetic head 1D of this embodiment, taken along a plane in a direction that is parallel to the moving direction of the magnetic recording medium 100 and is perpendicular to a plane facing the magnetic recording medium 100. As shown in FIG. 8, the moving direction of the magnetic recording medium 100 is toward the left-hand side or the right-hand side in the drawing.

The magnetic head 1D of this embodiment is the same as the magnetic head 1 of the first embodiment shown in FIG. 1, except that the driving current from the driving current source 30 is applied to the spin torque oscillator 20 through extension wires 22 that are provided on the faces of the main magnetic poles 11 and 12 facing each other, with insulating layers 24 being sandwiched between the extension wires 22 and the faces of the main magnetic poles 11 and 12 facing each other. The extension wires 22 are electrically connected to the driving current source 30 via a wire 32. Unlike any of the magnetic heads of the first through third embodiments, the magnetic head 1D is designed to have a driving current that does not flow through the main magnetic poles 11 and 12 when applied to the spin torque oscillator 20. The insulating layers 24 may be made of aluminum oxide, for example. In this embodiment, the magnetization directions of the bias layer $20_2$, the oscillation layer $20_3$, and the spin injection layer $20_5$ are the same (parallel to one another) when a current is not flowing.

As in this embodiment, it is of course possible that a current is applied to the spin torque oscillator through the extension wires 22 provided on the faces of the main magnetic poles 11 and 12 facing each other, with the insulating layers 24 being sandwiched between the extension wires 22 and the faces of the main magnetic poles 11 and 12 facing each other, not only in the magnetic head of the first embodiment but also in either of the magnetic heads of the second and third embodiments.

As in the first embodiment, components of the recording magnetic fields 40 generated from the respective main magnetic poles 11 and 12 cancel each other in a direction perpendicular to the film plane of the spin torque oscillator 20 in this embodiment. Accordingly, the amount of the recording magnetic fields 40 flowing into the spin torque oscillator 20 can be reduced, and the high-frequency magnetic field 44 generated from the spin torque oscillator 20 can be stabilized.

Fifth Embodiment

Figure 9:
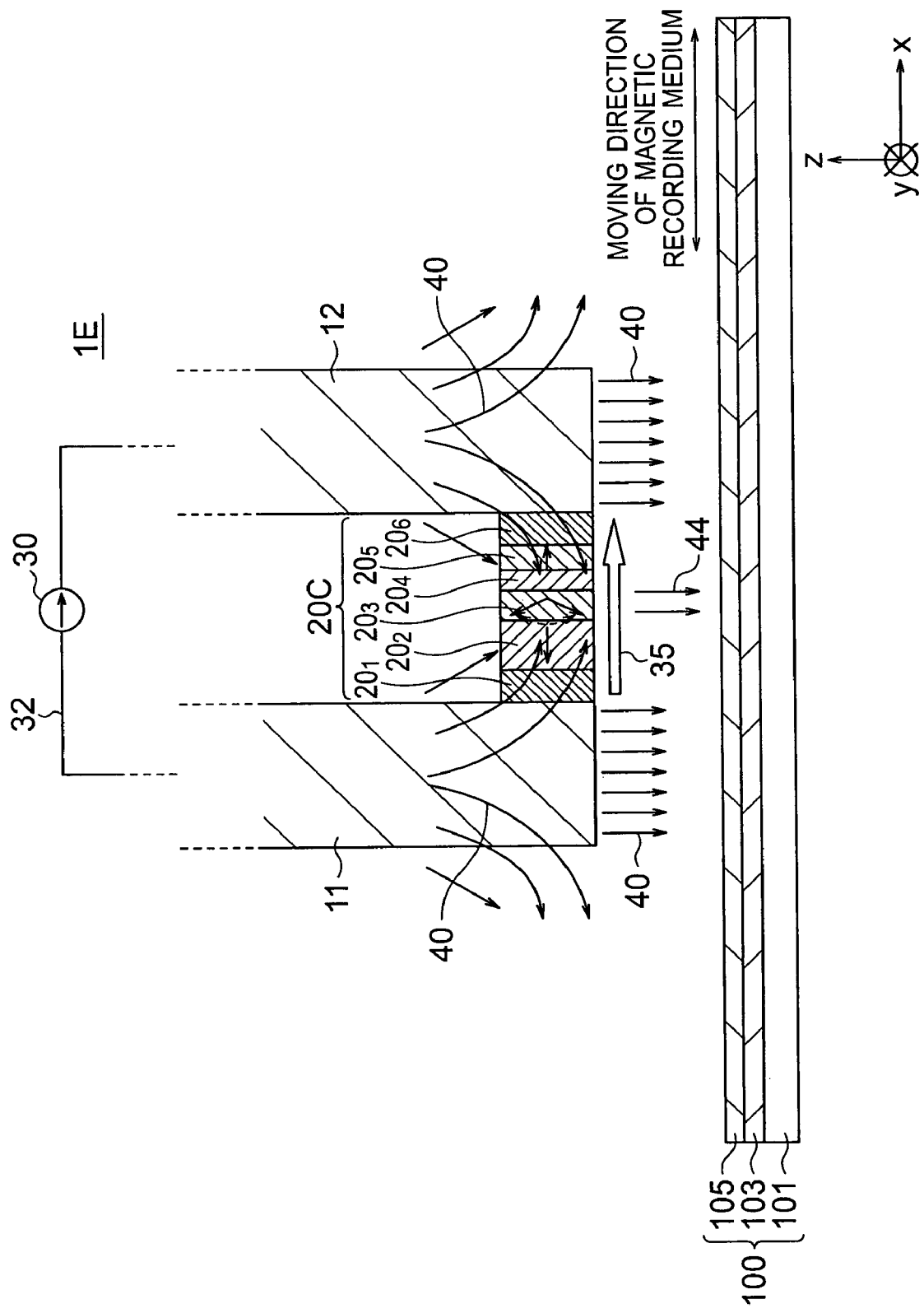
FIG. 9 is a cross-sectional view of a magnetic head according to a fifth embodiment of the present invention.

FIG. 9 shows a magnetic head in accordance with a fifth embodiment of the present invention. FIG. 9 is a cross-sectional view of the magnetic head 1E of this embodiment, taken along a plane in a direction that is parallel to the moving direction of the magnetic recording medium 100 and is perpendicular to a plane facing the magnetic recording medium 100. As shown in FIG. 9, the moving direction of the magnetic recording medium 100 is toward the left-hand side or the right-hand side in the drawing.

The magnetic head 1E of this embodiment is the same as the magnetic head 1 of the first embodiment shown in FIG. 1, except that the spin torque oscillator 20 is replaced with a spin torque oscillator 20C. The spin torque oscillator 20C differs from the spin torque oscillator 20 in that the magnetization directions of the bias layer $20_2$ and the spin injection layer $20_5$ are the opposite directions from each other (antiparallel to each other) when a current is not flowing. Also, the driving current direction 35 from the driving current source 30 is the opposite direction from the driving current direction 35 in the first embodiment.

In this embodiment, when the driving current is flowing into the spin torque oscillator 20, the electrons having spins polarized by the spin injection layer $20_5$ pass through the intermediate layer $20_4$ and reach the oscillation layer $20_3$. The electrons interact with the magnetization of the oscillation layer $20_3$, so that a high-frequency magnetic field is generated. In the magnetic head 1E of this embodiment, the extension wires 22 shown in FIG. 8 can be used.

The axis of easy magnetization in the spin torque oscillator 20 is in the same direction as the driving current applying direction or in the opposite direction from the driving current applying direction. This is to avoid adverse influence of the current magnetic field generated by the driving current.

As in the first embodiment, components of the recording magnetic fields 40 generated from the respective main magnetic poles 11 and 12 cancel each other in a direction perpendicular to the film plane of the spin torque oscillator 20C in this embodiment. Accordingly, the amount of the recording magnetic fields 40 flowing into the spin torque oscillator 20C can be reduced, and the high-frequency magnetic field 44 generated from the spin torque oscillator 20C can be stabilized.

Sixth Embodiment

Figure 10:
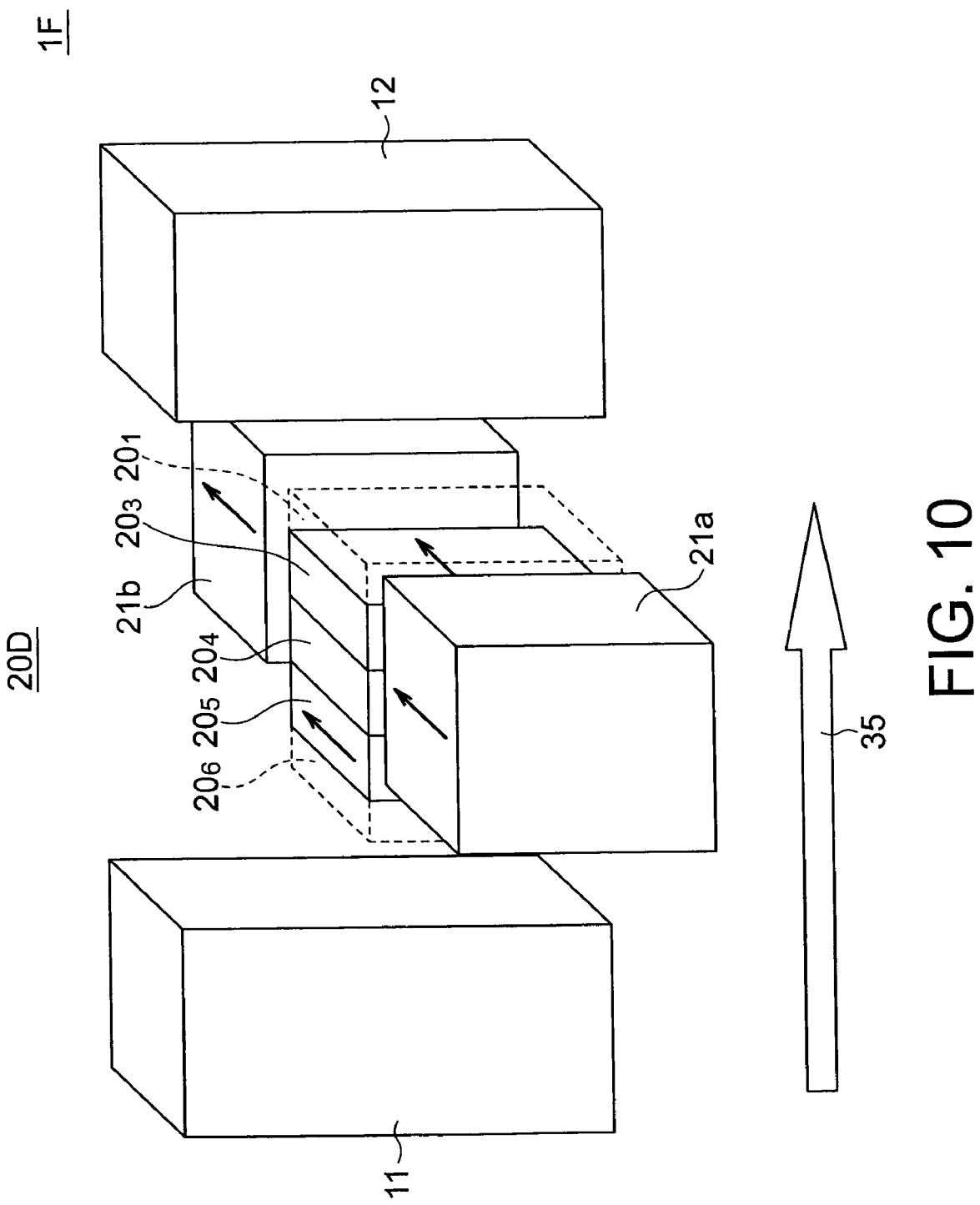
FIG. 10 is a perspective view of a magnetic head according to a sixth embodiment.

FIG. 10 shows a magnetic head in accordance with a sixth embodiment of the present invention. FIG. 10 is a perspective view of the magnetic head of this embodiment. The magnetic head 1F of this embodiment includes main magnetic poles 11 and 12 facing each other, and a spin torque oscillator 20D placed between the main magnetic poles 11 and 12. The spin torque oscillator 20D includes a stacked structure, and magnetization control layers (field applying units) $21a$ and $21b$ that sandwich the stacked structure and have the same magnetization directions as each other. The stacked structure is formed with a pair of electrodes $20_1$ and $20_6$, and an oscillation layer $20_3$, an intermediate layer $20_4$, and a spin injection layer $20_5$ that are provided between the electrodes $20_1$ and $20_6$. Although not shown in FIG. 10, the spin torque oscillator 20D may includes another electrode or the like. The magnetization control layers $21a$ and $21b$ control the magnetization direction of the oscillation layer $20_3$ to be the same as (parallel to) the magnetization directions of the magnetization control layers $21a$ and $21b$, when a driving current is not flowing into the spin torque oscillator 20D. The magnetization control layers $21a$ and $21b$ are placed in a direction orthogonal to the direction of the pair of magnetic poles 11 and 12. In this embodiment, the magnetization direction of the spin injection layer $20_5$ is parallel to the film plane and is also parallel to a magnetic recording medium (not shown). The magnetization directions of the magnetization control layers $21a$ and $21b$ are parallel to the magnetization direction of the spin injection layer $20_5$.

In this embodiment, electrons having spins in the opposite direction from the magnetization direction of the spin injection layer $20_5$ are reflected by the interface between the intermediate layer $20_4$ and the spin injection layer $20_5$, and are injected into the oscillation layer $20_3$ to cause oscillations.

In this embodiment, the same materials as those mentioned in the first embodiment can be used for the oscillation layer $20_3$, the spin injection layer $20_5$, and the intermediate layer $20_4$. The magnetization direction of the spin injection layer $20_5$ and the magnetization direction of the oscillation layer $20_3$ may be parallel to each other, but may be made antiparallel to each other by using Ru or the like as the intermediate layer $20_4$ to form a stacked ferri-structure. In such a case, the driving current direction is reversed.

Examples of materials for the magnetization control layer include:

(1) CoCr magnetic alloy films each having magnetization oriented in a direction parallel to the film plane;
(2) CoCr magnetic films each having magnetization oriented in a direction perpendicular to the film plane, such as a CoCrPt film, a CoCrTa film, a CoCrTaPt film, and a CoCrTaNb film (suitable as spin injection layers and bias layers);
(3) RE-TM amorphous alloy magnetic films, such as a TbFeCo film (suitable as spin injection layers and bias layers);
(4) Co artificial lattice magnetic films, such as a Co/Pd film, a Co/Pt film, and a CoCrTa/Pd film (suitable as spin injection layers and bias layers);
(5) materials with excellent vertical alignment, such as CoPt or FePt alloy magnetic films and SmCo alloy magnetic layers (suitable as spin injection layers and bias layers); and
(6) alloys that are formed by adding Al, Si, Ge, Mn, or Cr to CoFe (suitable as spin injection layers and bias layers).

As in the first embodiment, components of the recording magnetic fields generated from the respective main magnetic poles 11 and 12 cancel each other in a direction perpendicular to the film plane of the spin torque oscillator 20D in this embodiment. Accordingly, the amount of the recording magnetic fields flowing into the spin torque oscillator 20D can be reduced, and the high-frequency magnetic field generated from the spin torque oscillator 20D can be stabilized.

Seventh Embodiment

Figure 11:
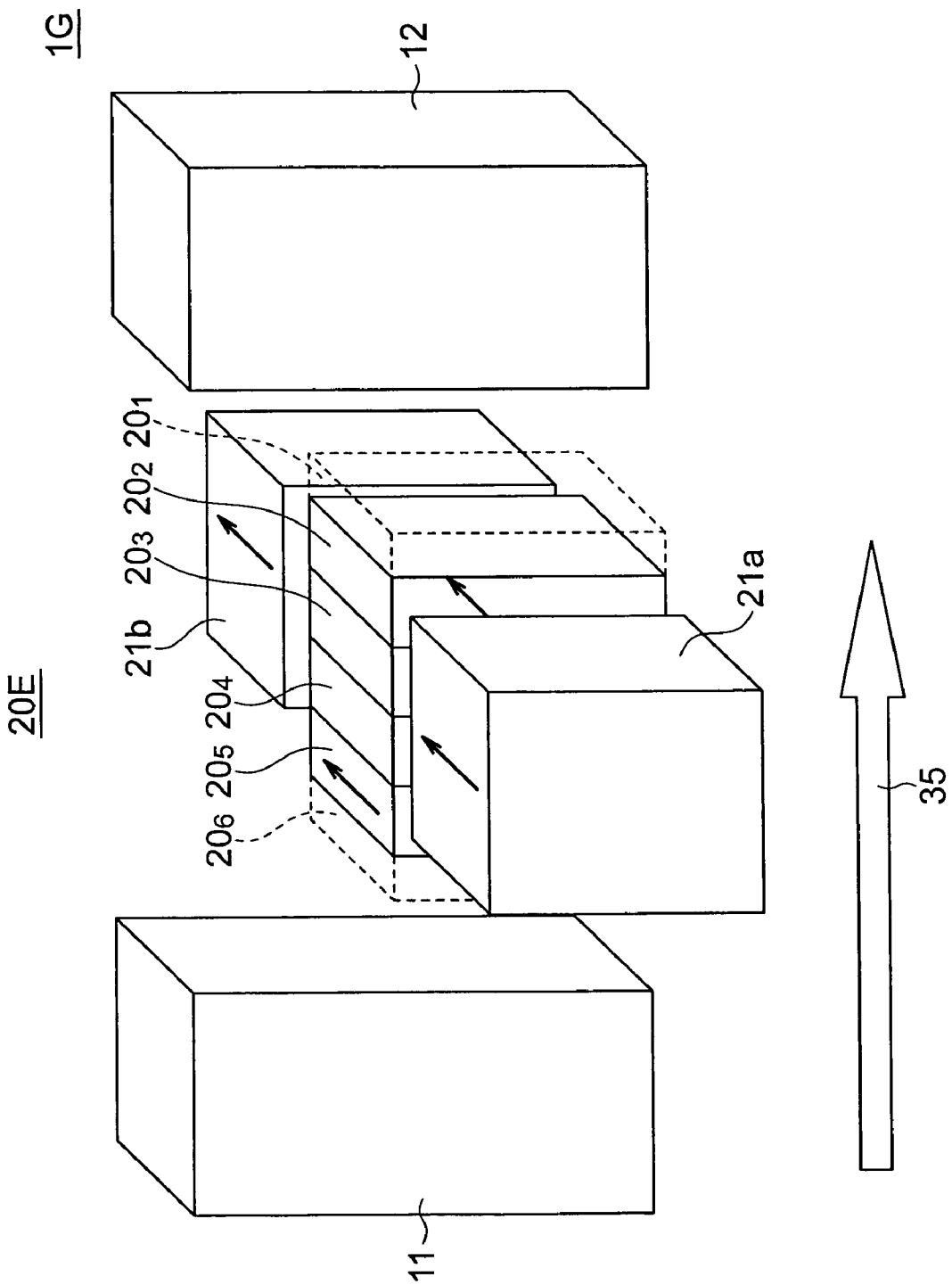
FIG. 11 is a perspective view of a magnetic head according to a seventh embodiment.

FIG. 11 shows a magnetic head in accordance with a seventh embodiment of the present invention. The magnetic head 1G of this embodiment is the same as the magnetic head 1F of the sixth embodiment, except that the spin torque oscillator 20D is replaced with a spin torque oscillator 20E. This spin torque oscillator 20E is the same as the spin torque oscillator 20D, except that a bias layer $20_2$ is provided between the oscillation layer $20_3$ and the electrode $20_1$. With the bias layer $20_2$, the oscillating actions of the oscillation layer $20_3$ are stabilized, and the frequency of the high-frequency magnetic field becomes also stable.

The same materials as those mentioned in the first embodiment can be used for the bias layer $20_2$, the oscillation layer $20_3$, the spin injection layer $20_5$, and the intermediate layer $20_4$ of this embodiment. It is particularly preferable that the bias layer $20_2$ is made of an antiferromagnetic material, so as to stabilize the oscillation frequency.

As in the sixth embodiment, components of the recording magnetic fields generated from the respective main magnetic poles 11 and 12 cancel each other in a direction perpendicular to the film plane of the spin torque oscillator 20E in this embodiment. Accordingly, the amount of the recording magnetic fields flowing into the spin torque oscillator 20E can be reduced, and the high-frequency magnetic field generated from the spin torque oscillator 20E can be stabilized.

Eighth Embodiment

Figure 12:
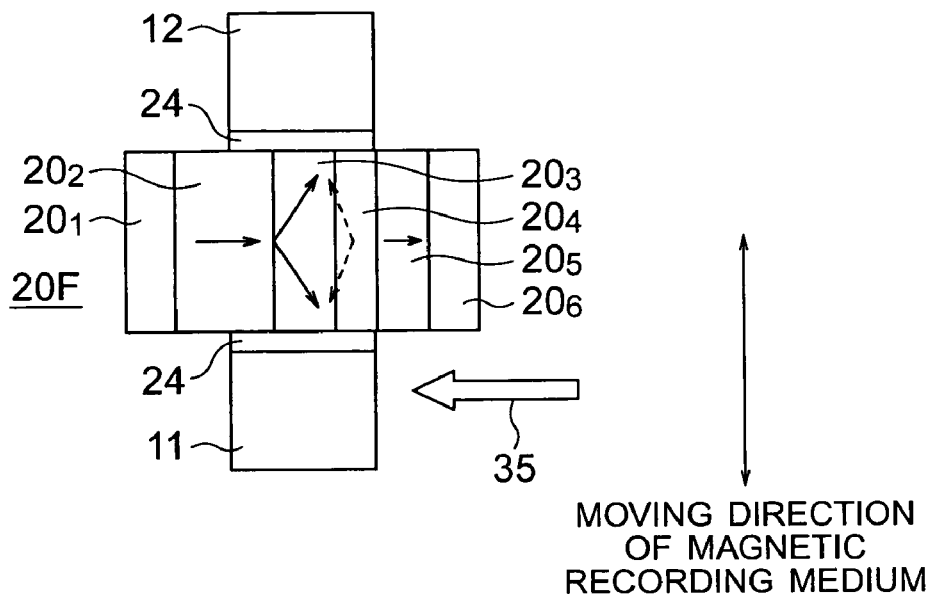
FIG. 12 is a plan view of a magnetic head according to an eighth embodiment.

A magnetic head in accordance with an eighth embodiment of the present invention is shown in FIG. 12. FIG. 12 is a plan view of the magnetic head 1H of this embodiment, seen from a magnetic recording medium side. The magnetic head 1H of this embodiment includes a pair of main magnetic poles 11 and 12 facing each other, and a spin torque oscillator 20F placed between the main magnetic poles 11 and 12. The spin torque oscillator 20F has a stacked structure formed with an electrode $20_1$, a bias layer $20_2$, an oscillation layer $20_3$, an intermediate layer $20_4$, a spin injection layer $20_5$ and an electrode $20_6$. The stacking direction of the respective layers in the spin torque oscillator 20 is substantially orthogonal to the aligning direction of the main magnetic poles 11 and 12. In other words, the main magnetic poles 11 and 12 are located on the sides of the spin torque oscillator 20F. The side faces of the sides of the spin torque oscillator 20F are electrically insulated from the main magnetic poles 11 and 12 by insulating layers 24. When a current is not flowing, the magnetization directions of the bias layer $20_2$, the oscillation layer $20_3$, and the spin injection layer $20_5$ are the same as one another (parallel to one another). Those magnetization directions are substantially perpendicular to the film plane, and are directions from the electrode $20_1$ to the electrode $20_6$.

In this embodiment, the current flowing into the spin torque oscillator 20F flows from the electrode $20_6$ to the electrode $20_1$, and the moving direction of a magnetic recording medium is parallel to the aligning direction of the main magnetic poles 11 and 12.

The same materials as those mentioned in the first embodiment can be used for the bias layer $20_2$, the oscillation layer $20_3$, the spin injection layer $20_5$, and the intermediate layer $20_4$ of this embodiment. It is particularly preferable that the bias layer $20_2$ is made of an antiferromagnetic material, so as to stabilize the oscillation frequency.

In this embodiment, components of the recording magnetic fields generated from the respective main magnetic poles 11 and 12 cancel each other in a direction parallel to the film plane of the spin torque oscillator 20F (or in the aligning direction of the main magnetic poles 11 and 12). Accordingly, the amount of the recording magnetic fields flowing into the spin torque oscillator 20F can be reduced, and the high-frequency magnetic field generated from the spin torque oscillator 20F can be stabilized.

Ninth Embodiment

Figure 13:
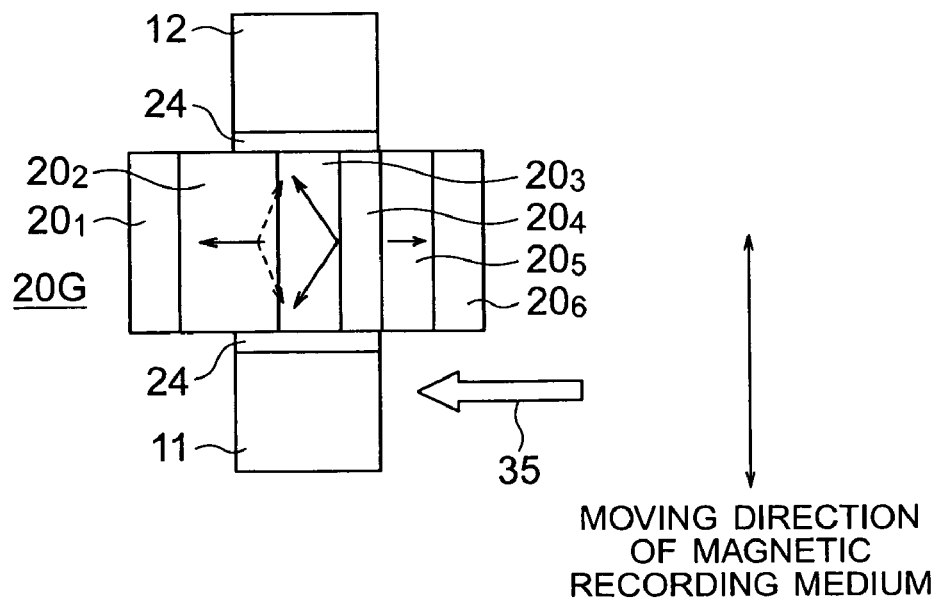
FIG. 13 is a plan view of a magnetic head according to a ninth embodiment.

A magnetic head in accordance with a ninth embodiment of the present invention is shown in FIG. 13. FIG. 13 is a plan view of the magnetic head 1I of this embodiment, seen from a magnetic recording medium side. The magnetic head 1I of this embodiment is the same as the magnetic head 1H of the eighth embodiment, except that the spin torque oscillator 20F is replaced with a spin torque oscillator 20G. This spin torque oscillator 20G has the same stacked structure as the spin torque oscillator 20F, but the magnetization directions of the bias layer $20_2$ and the oscillation layer $20_3$ observed when a current is not flowing are the opposite from (antiparallel to) the magnetization direction of the spin injection layer $20_5$. Those magnetization directions are directions from the electrode $20_6$ to the electrode $20_1$. In this embodiment, the current flowing into the spin torque oscillator 20G flows from the electrode $20_1$ to the electrode $20_6$, which is the opposite of the current flowing direction in the eighth embodiment. The moving direction of the magnetic recording medium is parallel to the aligning direction of the main magnetic poles 11 and 12, which is the same as in the eighth embodiment.

The same materials as those mentioned in the first embodiment can be used for the bias layer $20_2$, the oscillation layer $20_3$, the spin injection layer $20_5$, and the intermediate layer $20_4$ of this embodiment. It is particularly preferable that the bias layer $20_2$ is made of an antiferromagnetic material, so as to stabilize the oscillation frequency.

As in the eighth embodiment, components of the recording magnetic fields generated from the respective main magnetic poles 11 and 12 cancel each other in a direction parallel to the film plane of the spin torque oscillator 20G (or in the aligning direction of the main magnetic poles 11 and 12) in this embodiment. Accordingly, the amount of the recording magnetic fields flowing into the spin torque oscillator 20G can be reduced, and the high-frequency magnetic field generated from the spin torque oscillator 20G can be stabilized.

Tenth Embodiment

Figure 14:
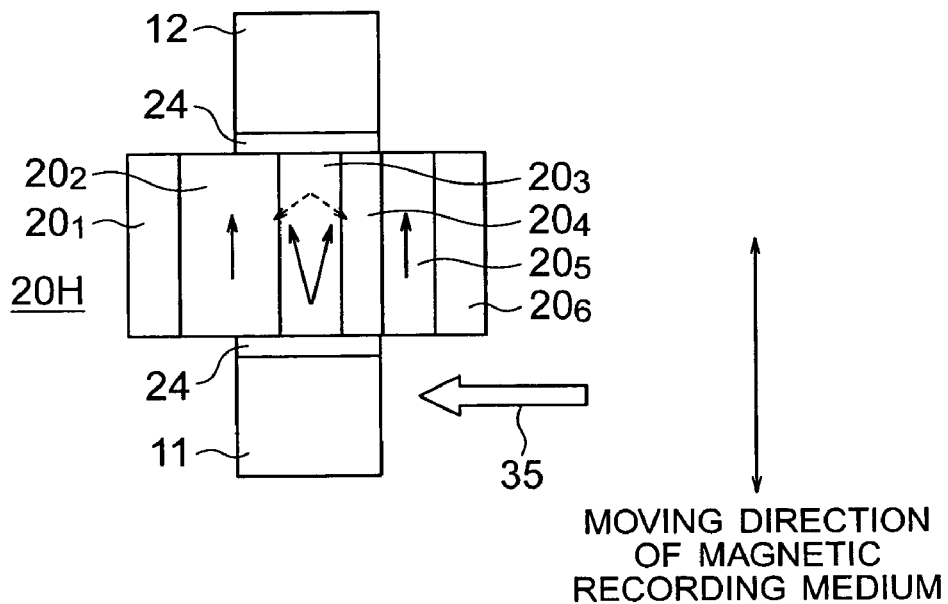
FIG. 14 is a plan view of a magnetic head according to a tenth embodiment.

A magnetic head in accordance with a tenth embodiment of the present invention is shown in FIG. 14. FIG. 14 is a plan view of the magnetic head 1J of this embodiment, seen from a magnetic recording medium side. The magnetic head 13 of this embodiment is the same as the magnetic head 1H of the eighth embodiment, except that the spin torque oscillator 20F is replaced with a spin torque oscillator 20H. This spin torque oscillator 20H has the same stacked structure as the spin torque oscillator 20F, but the magnetization directions of the bias layer $20_2$ and the oscillation layer $20_3$ observed when a current is not flowing are the same as (parallel to) the magnetization direction of the spin injection layer $20_5$. Those magnetization directions are substantially parallel to the film plane of the stacked structure, and are directions from the main magnetic pole 11 to the main magnetic pole 12. In this embodiment, the current flowing into the spin torque oscillator 20H flows from the electrode $20_6$ to the electrode $20_1$, which is the same as the current flowing direction in the eighth embodiment. The moving direction of the magnetic recording medium is parallel to the aligning direction of the main magnetic poles 11 and 12, which is also the same as in the eighth embodiment.

It is also possible that the magnetization directions of the bias layer $20_2$ and the oscillation layer $20_3$ are the opposite from the magnetization direction of the spin injection layer $20_5$. In such a case, Ru or the like is used as the intermediate layer $20_4$ so as to form a stacked ferri-structure, and the driving current applying direction is reversed.

The same materials as those mentioned in the first embodiment can be used for the bias layer $20_2$, the oscillation layer $20_3$, the spin injection layer $20_5$, and the intermediate layer $20_4$ of this embodiment. It is particularly preferable that the bias layer $20_2$ is made of an antiferromagnetic material, so as to stabilize the oscillation frequency.

As in the eighth embodiment, components of the recording magnetic fields generated from the respective main magnetic poles 11 and 12 cancel each other in a direction parallel to the film plane of the spin torque oscillator 20H (or in the aligning direction of the main magnetic poles 11 and 12) in this embodiment. Accordingly, the amount of the recording magnetic fields flowing into the spin torque oscillator 20H can be reduced, and the high-frequency magnetic field generated from the spin torque oscillator 20H can be stabilized.

Eleventh Embodiment

Figure 15:
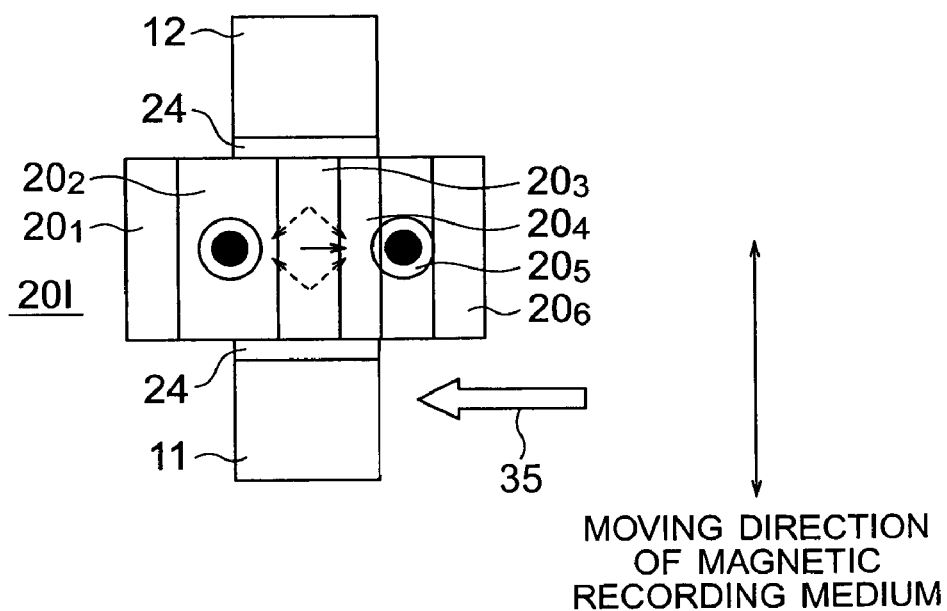
FIG. 15 is a plan view of a magnetic head according to an eleventh embodiment.

A magnetic head in accordance with an eleventh embodiment of the present invention is shown in FIG. 15. FIG. 15 is a plan view of the magnetic head 1K of this embodiment, seen from a magnetic recording medium side. The magnetic head 1K of this embodiment is the same as the magnetic head 1J of the tenth embodiment, except that the spin torque oscillator 20H is replaced with a spin torque oscillator 20I. This spin torque oscillator 20I has the same stacked structure as the spin torque oscillator 20H, but the magnetization directions of the bias layer $20_2$, the oscillation layer $20_3$, and the spin injection layer $20_5$ observed when a current is not flowing are the same as (parallel to) one another. Those magnetization directions are substantially parallel to the film plane of the stacked structure, and are substantially perpendicular to the direction from the main magnetic pole 11 to the main magnetic pole 12. In this embodiment, the current flowing into the spin torque oscillator 20I flows from the electrode $20_6$ to the electrode $20_1$, which is the same as the current flowing direction in the tenth embodiment. The moving direction of the magnetic recording medium is parallel to the aligning direction of the main magnetic poles 11 and 12, which is also the same as in the tenth embodiment.

It is also possible that the magnetization directions of the bias layer $20_2$ and the oscillation layer $20_3$ are the opposite from the magnetization direction of the spin injection layer $20_5$. In such a case, Ru or the like is used as the intermediate layer $20_4$ so as to form a stacked ferri-structure, and the driving current applying direction is reversed.

The same materials as those mentioned in the first embodiment can be used for the bias layer $20_2$, the oscillation layer $20_3$, the spin injection layer $20_5$, and the intermediate layer $20_4$ of this embodiment. It is particularly preferable that the bias layer $20_2$ is made of an antiferromagnetic material, so as to stabilize the oscillation frequency.

As in the tenth embodiment, the recording magnetic fields generated from the respective main magnetic poles 11 and 12 cancel each other in a direction parallel to the film plane of the spin torque oscillator 20I (or in the aligning direction of the main magnetic poles 11 and 12) in this embodiment. Accordingly, the amount of the recording magnetic fields flowing into the spin torque oscillator 20I can be reduced, and the high-frequency magnetic field generated from the spin torque oscillator 20I can be stabilized.

Twelfth Embodiment

Figure 16:
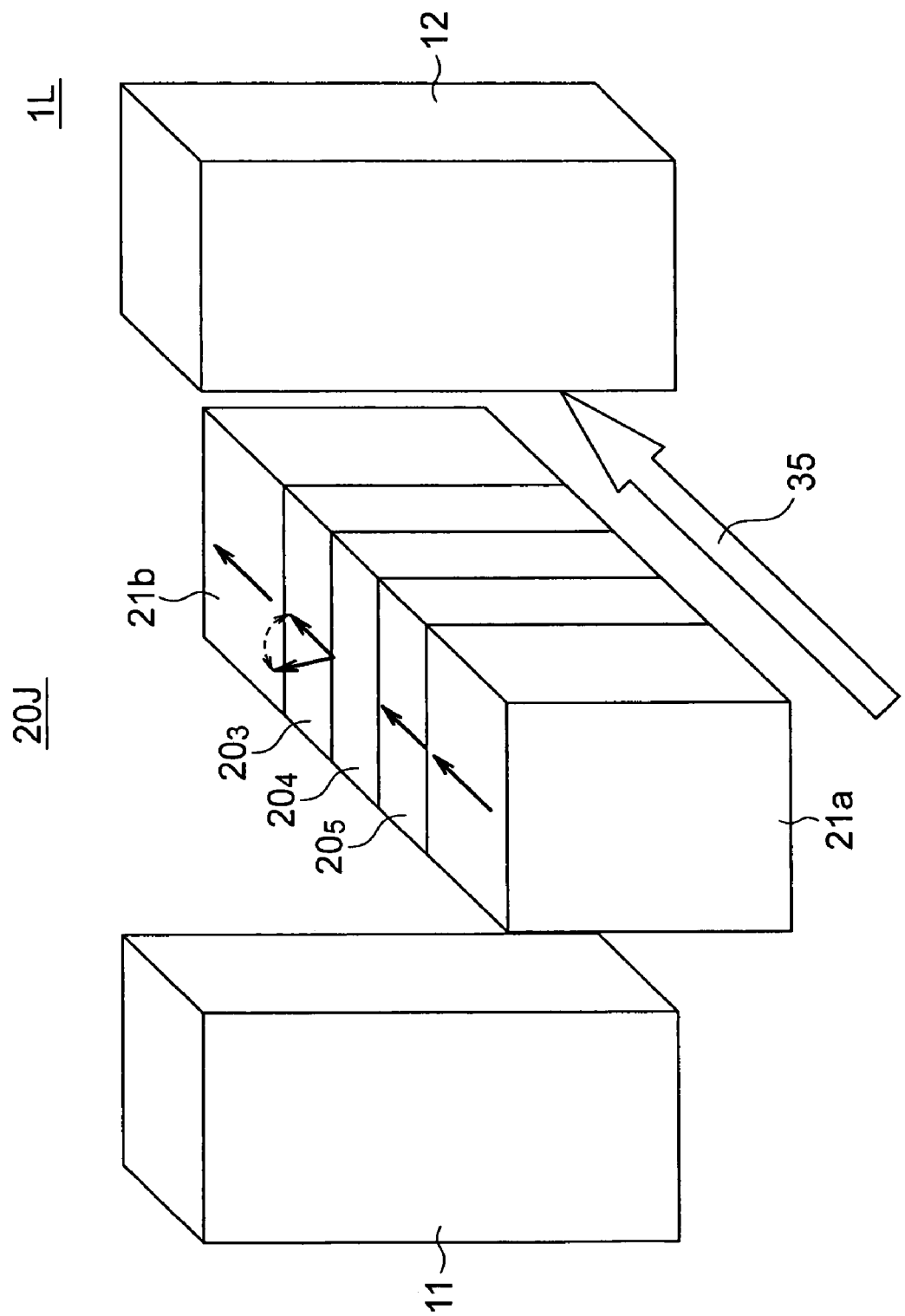
FIG. 16 is a plan view of a magnetic head according to a twelfth embodiment.

A magnetic head in accordance with a twelfth embodiment of the present invention is shown in FIG. 16. FIG. 16 is a perspective view of the magnetic head 1L of this embodiment. The magnetic head 1L of this embodiment is the same as the magnetic head 1G of the seventh embodiment shown in FIG. 11, except that the spin torque oscillator 20E is replaced with a spin torque oscillator 20J. The film plane of the stacked structure of the spin torque oscillator 20E is substantially perpendicular to the aligning direction of the main magnetic poles 11 and 12. On the other hand, the spin torque oscillator 20J has a stacked structure formed with a magnetization control layer 21a, a spin injection layer $20_5$, an intermediate layer $20_4$, an oscillation layer $20_3$, and a magnetization control layer 21b. The film plane of this stacked structure is substantially parallel to the aligning direction of the main magnetic poles 11 and 12. When a current is not flowing, the magnetization directions of the magnetization control layer 21a, the spin injection layer $20_5$, the oscillation layer $20_3$, and the magnetization control layer 21b are substantially perpendicular to the film plane, and those directions are directions from the magnetization control layer 21a to the magnetization control layer 21b.

In this embodiment, components of the magnetization control layers 21a and 21b may also serve as the electrodes of the spin torque oscillator $20_3$, or electrodes may be provided outside the respective magnetization control layers 21a and 21b. The current flowing direction in the spin torque oscillator 20J is from the magnetization control layer 21a to the magnetization control layer 21b, or is the same as the magnetization directions of the magnetization control layer 21a, the spin injection layer 20₅, the oscillation layer 20₃, and the magnetization control layer 21b observed when a current is not flowing.

The same materials as those mentioned in the first embodiment can be used for the oscillation layer 20₃, the spin injection layer 20₅, and the intermediate layer 20₄ of this embodiment.

In this embodiment, the recording magnetic fields generated from the respective main magnetic poles 11 and 12 also cancel each other in a direction parallel to the film plane of the spin torque oscillator 20J (or in the aligning direction of the main magnetic poles 11 and 12). Accordingly, the amount of the recording magnetic fields flowing into the spin torque oscillator 20J can be reduced, and the high-frequency magnetic field generated from the spin torque oscillator 20J can be stabilized.

Thirteenth Embodiment

Figure 17:
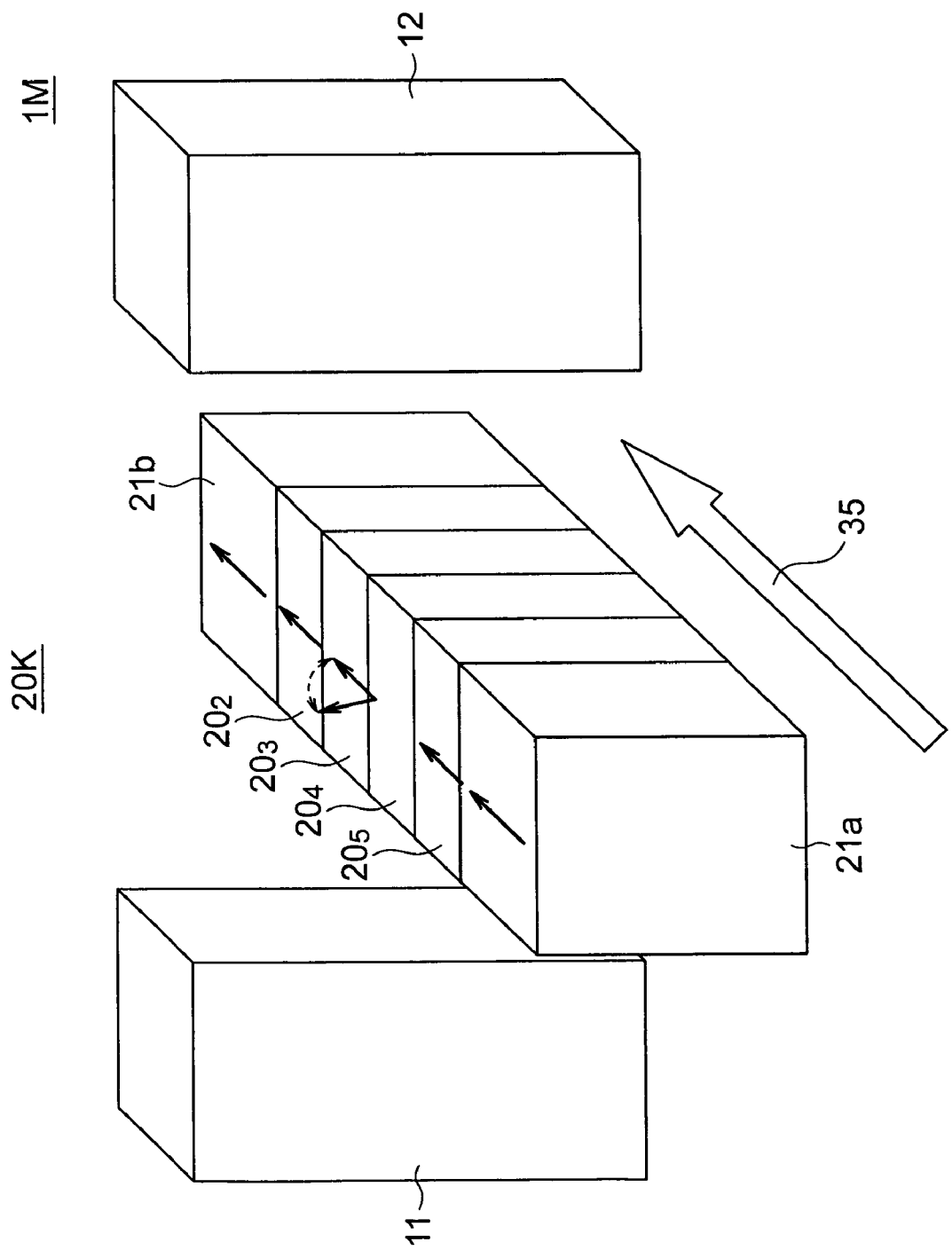
FIG. 17 is a plan view of a magnetic head according to a thirteenth embodiment.

A magnetic head in accordance with a thirteenth embodiment of the present invention is shown in FIG. 17. FIG. 17 is a perspective view of the magnetic head IM of this embodiment. The magnetic head IM of this embodiment is the same as the magnetic head 1L of the twelfth embodiment shown in FIG. 16, except that the spin torque oscillator 20J is replaced with a spin torque oscillator 20K. The spin torque oscillator 20K is the same as the spin torque oscillator 20J, except that a bias layer 20₂ is provided between the oscillation layer 20₃ and the magnetization control layer 21b. The spin torque oscillator 20K has a stacked structure formed with the magnetization control layer 21a, the spin injection layer 20₅, the intermediate layer 20₄, the oscillation layer 20₃, the bias layer 20₂, and the magnetization control layer 21b. The film plane of this stacked structure is substantially parallel to the aligning direction of the main magnetic poles 11 and 12. When a current is not flowing, the magnetization directions of the magnetization control layer 21a, the spin injection layer 20₅, the oscillation layer 20₃, the bias layer 20₂, and the magnetization control layer 21b are substantially perpendicular to the film plane, and those directions are directions from the magnetization control layer 21a to the magnetization control layer 21b.

As in the twelfth embodiment, the magnetization control layers 21a and 21b may also serve as the electrodes of the spin torque oscillator 20K, or electrodes may be provided outside the respective magnetization control layers 21a and 21b in this embodiment. The current flowing direction in the spin torque oscillator 20K is from the magnetization control layer 21a to the magnetization control layer 21b, or is the same as the magnetization directions of the magnetization control layer 21a, the spin injection layer 20₅, the oscillation layer 20₃, the bias layer 20₂, and the magnetization control layer 21b observed when a current is not flowing.

The same materials as those mentioned in the first embodiment can be used for the bias layer 20₂, the oscillation layer 20₃, the spin injection layer 20₅, and the intermediate layer 20₄ of this embodiment. It is particularly preferable that the bias layer 20₂ is made of an antiferromagnetic material, so as to stabilize the oscillation frequency.

In this embodiment, components of the recording magnetic fields generated from the respective main magnetic poles 11 and 12 also cancel each other in a direction parallel to the film plane of the spin torque oscillator 20L (or in the aligning direction of the main magnetic poles 11 and 12). Accordingly, the amount of the recording magnetic fields flowing into the spin torque oscillator 20K can be reduced, and the high-frequency magnetic field generated from the spin torque oscillator 20K can be stabilized.

Fourteenth Embodiment

Next, a magnetic recording and reproducing device in accordance with the present invention is described. The magnetic head of each of the embodiments of the present invention and their modifications described with reference to FIGS. 1 through 17 can be incorporated into a magnetic head assembly of an integrated recording and reproducing type, and can be mounted on a magnetic recording and reproducing device.

Figure 18:
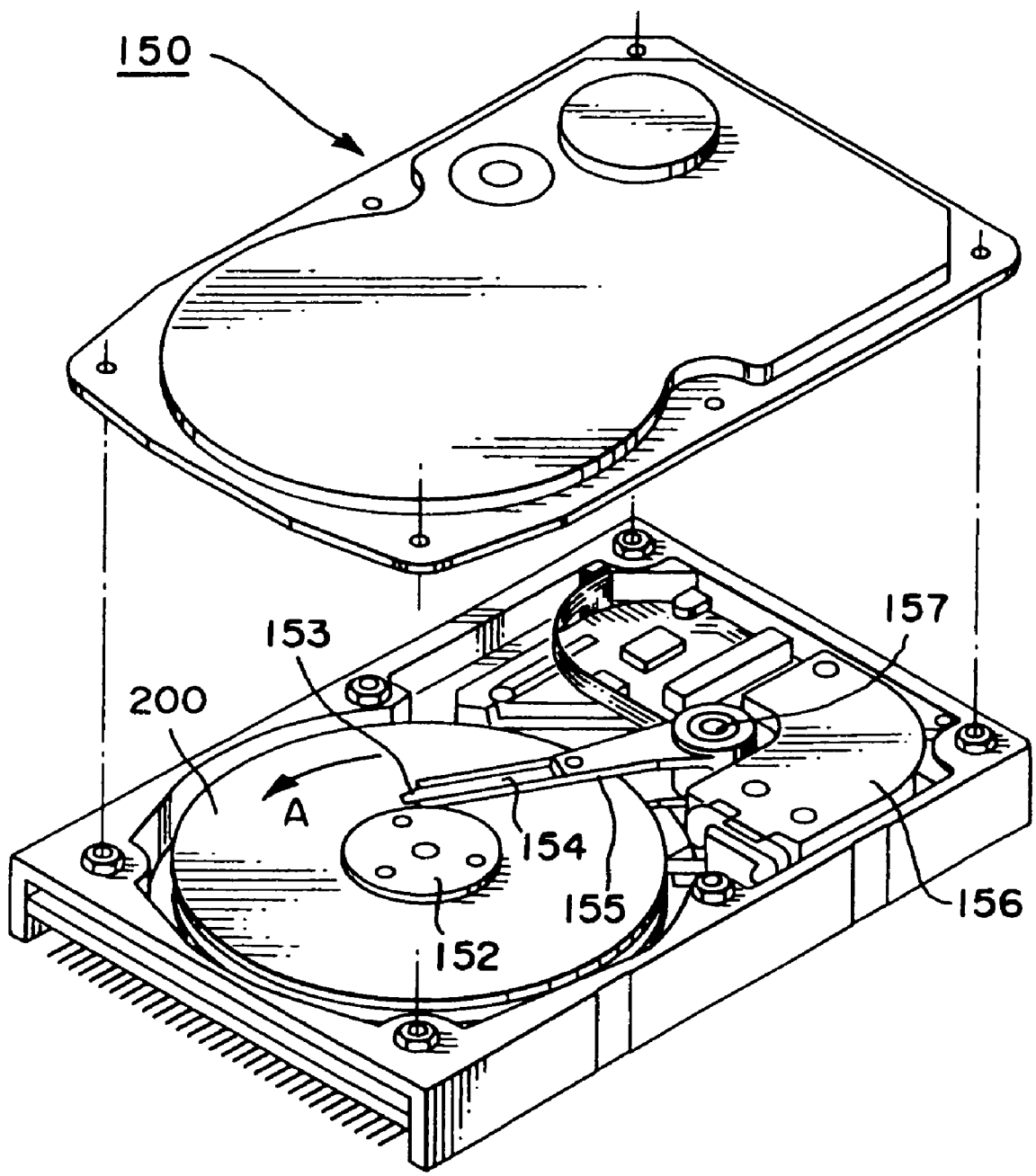
FIG. 18 is a perspective view of a magnetic recording and reproducing device according to a fourteenth embodiment.

FIG. 18 is a schematic perspective view showing the components of such a magnetic recording device. The magnetic recording and reproducing device 150 of this embodiment is a device with a rotary actuator. In FIG. 18, a longitudinal-direction or vertical-direction recording magnetic disk 200 is mounted onto a spindle 152, and is rotated in the direction of the arrow A by a motor (not shown) that responds to a control signal supplied from a driving device controller (not shown). The magnetic disk 200 is a two-layer magnetic recording medium that has a perpendicular recording layer and a soft-magnetic backing layer. A head slider 153 that reproduces the information recorded on the magnetic disk 200 is attached to the top end of a thin-film suspension 154. Here, the head slider 153 has a magnetic head of one of the above described embodiments in the vicinity of the top end.

When the magnetic disk 200 is rotated, the air bearing surface (ABS) of the head slider 153 is maintained at a predetermined floating distance from the surface of the magnetic disk 200.

The suspension 154 is connected to one end of an actuator arm 155 that has a bobbin portion for holding a driving coil (not shown). A voice coil motor 156 that is a kind of a linear motor is attached to the other end of the actuator arm 155. The voice coil motor 156 is formed with the driving coil (not shown) wound around the bobbin portion of the actuator arm 155, and a magnetic circuit that includes a permanent magnet and a facing yoke that face each other and sandwich the driving coil.

The actuator arm 155 is held by ball bearings (not shown) provided at an upper portion and a lower portion of a fixed axis 157, and can freely rotate and slide by virtue of the voice coil motor 156.

Figure 19:
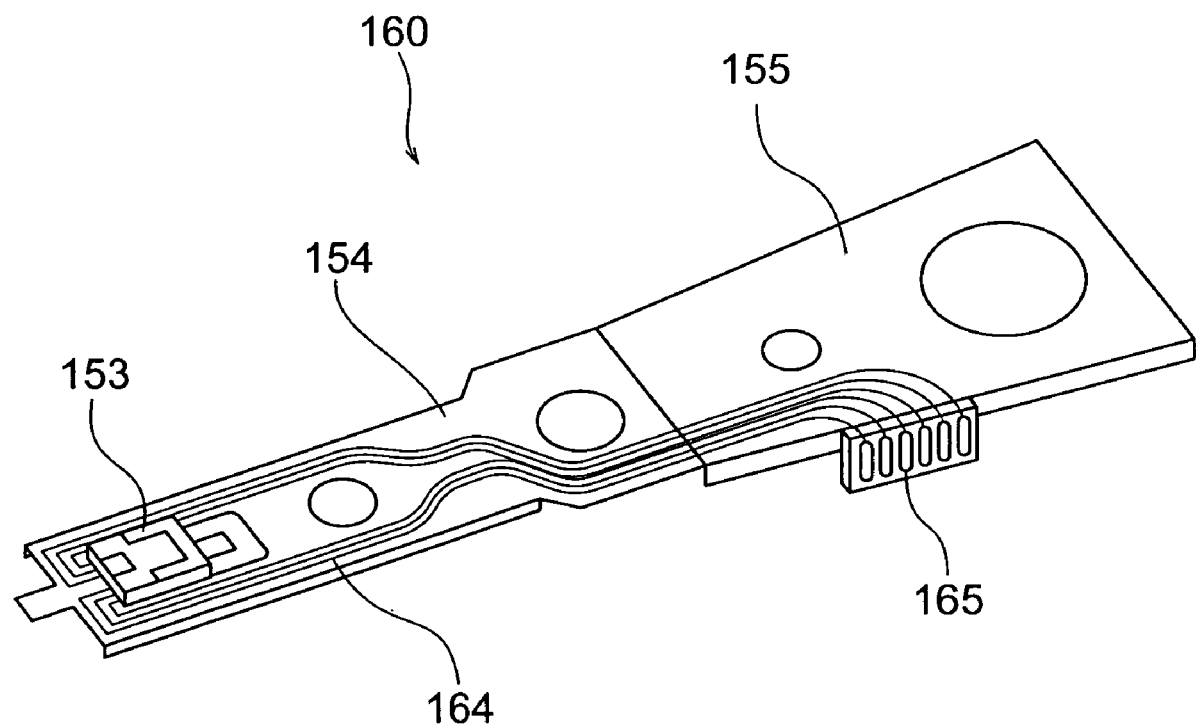
FIG. 19 is a perspective view of the top portions of the magnetic head assembly including the actuator arm of the fourteenth embodiment, seen from the disk side.
Figure 20:
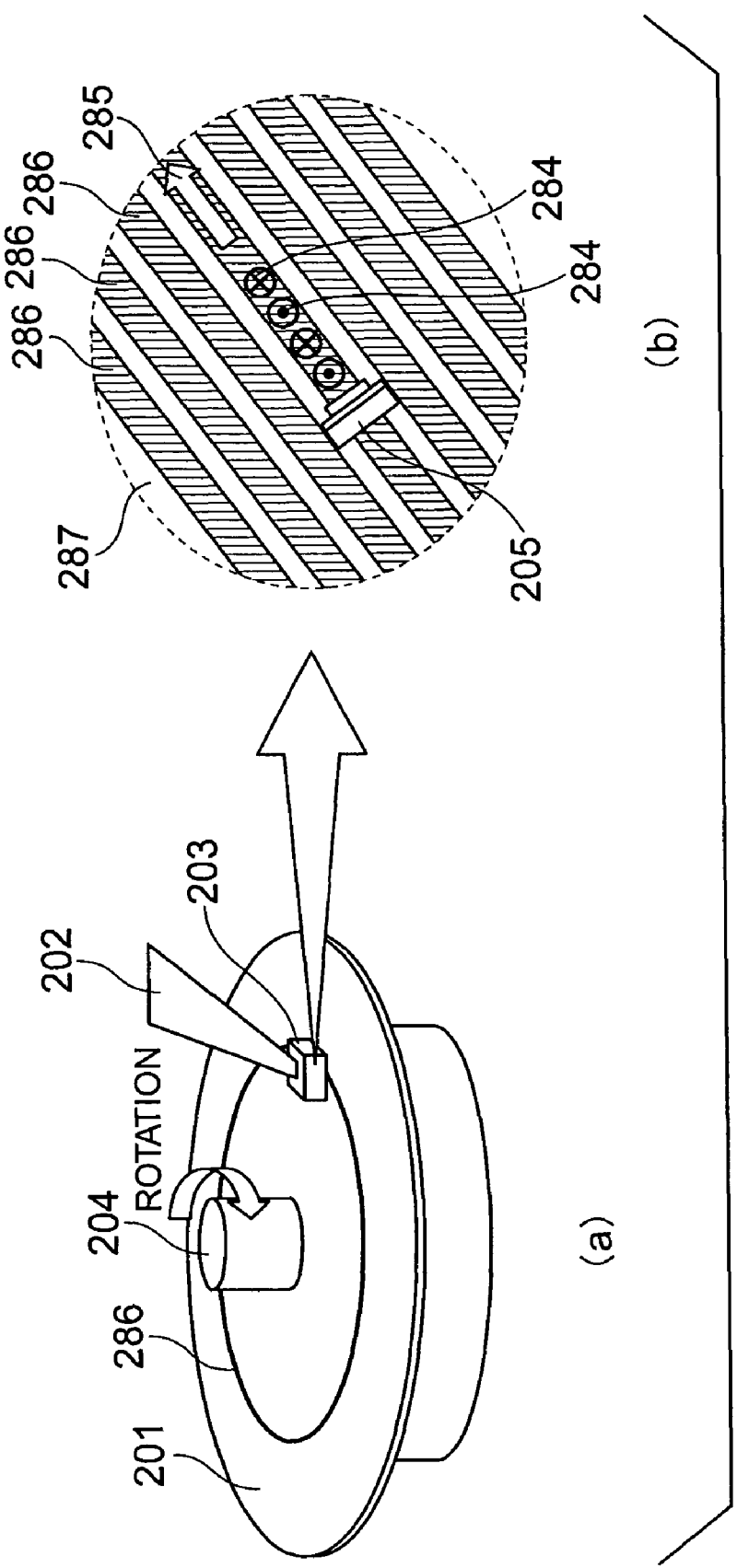
FIGS. 20(a) and 20(b) illustrate a discrete-track magnetic recording medium that can be used in each of the embodiments.

FIG. 19 is an enlarged perspective view of the top portions of the magnetic head assembly including the actuator arm 155, seen from the disk side. The magnetic head assembly 160 includes the actuator arm 155 having the bobbin portion for holding the driving coil, for example. The suspension 154 is connected to one end of the actuator arm 155.

The head slider 153 having one of the reproducing magnetic heads described with reference to FIGS. 1 through 20 is attached to the top end of the suspension 154. The suspension 154 has lead lines 164 for signal writing and reading. The lead lines 164 are electrically connected to the respective electrodes of the magnetic head incorporated into the head slider 153. In FIG. 19, reference numeral 165 indicates electrode pads of the magnetic head assembly 160.

Here, the predetermined floating distance is maintained between the air bearing surface (ABS) of the head slider 153 and the surface of the magnetic disk 200.

The embodiments of the present invention have been described so far by way of specific examples. However, the present invention is not limited to those specific examples. For example, magnetic recording media that can be used in the present invention are not limited to the magnetic recording medium 100 shown in FIGS. 1 through 17, and any magnetic recording medium having a recording layer and a soft magnetic layer can be used to achieve the same effects as the above described effects. More specifically, it is possible to use a discrete track medium that has multiple tracks arranged in parallel with one another and nonmagnetic portions provided between the adjacent tracks, or a discrete bit medium that has magnetic bits and nonmagnetic portions provided between the magnetic bits.

Also, the materials and shapes of the components of magnetic heads are not limited to those described as the specific examples, and any materials and shapes that can be selected by those skilled in the art can be used to achieve the same effects as above.

Also, magnetic recording media that can be used in magnetic recording and reproducing devices are not limited to hard disks, but any other magnetic recording media such as flexible disks and magnetic cards can be used. Further, it is possible to employ a so-called "removable"-type device from which a magnetic recording medium can be detached.

FIGS. 20(a) and 20(b) show a specific example of a magnetic recording medium that can be used in each of the above described embodiments. The magnetic recording medium 201 in this specific example is a discrete magnetic recording medium having multiparticle magnetic discrete tracks 286 that are separated from one another by nonmagnetic portions (or air portions) 287 and are vertically oriented. When this medium 201 is rotated by a spindle motor 204 and is moved in the medium running direction 285, recorded magnetized portions 284 can be formed by a magnetic recording head 205 mounted onto a head slider 203. The head slider 203 is attached to the top end of a suspension 202. This suspension 202 has lead lines for signal writing and reading, and the lead lines are electrically connected to the respective electrodes of the magnetic head 205 incorporated into the head slider 203.

The width (TS) of the spin oscillator in the recording track width direction is made equal to or greater than the width (TW) of each of the recording tracks 286, and is made equal to or smaller than the recording track pitch (TP), so that a decrease in the coercivity of the adjacent recording tracks due to the leakage high-frequency magnetic field generated from the spin oscillator can be effectively restricted. Accordingly, in the magnetic recording medium in this specific example, microwave assisted magnetic recording can be performed effectively only on desired recording tracks 286.

In this specific example, a high-frequency assisted recording device having narrow tracks and a high track density is more readily realized than in a case where a multiparticle vertical medium of a so-called "non-gap film type" is used. Also, in a conventional magnetic recording head, an unwritable medium magnetic material with high magnetic anisotropic energy (Ku), such as FePt or SmCo, is used according to the microwave assisted magnetic recording method, so as to further reduce the nanometric size of the medium magnetic particles. In this manner, a magnetic recording medium having a much higher line recording density in the recording track direction (the bit direction) than a conventional magnetic recording medium can be obtained.

Figure 21:
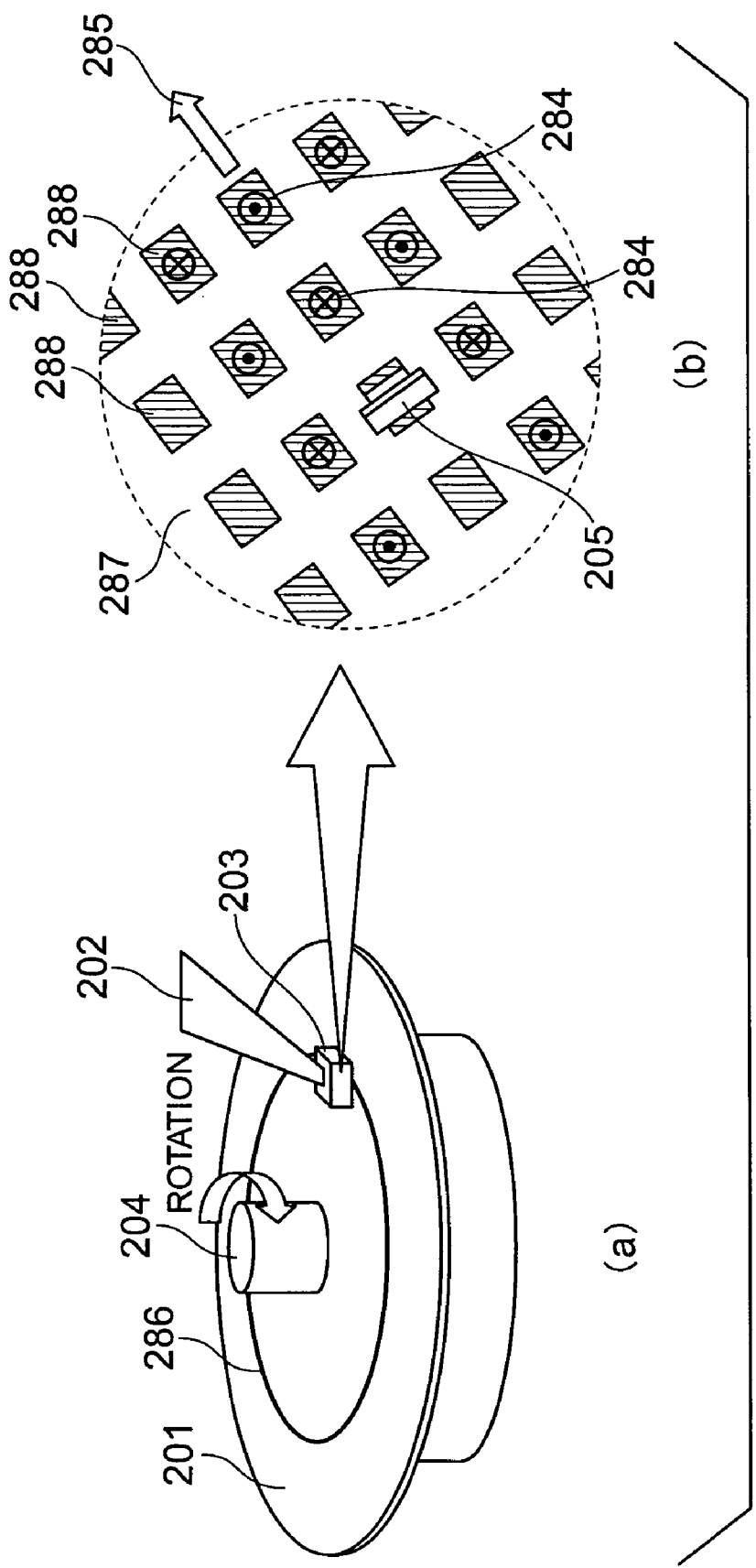
FIGS. 21(a) and 21(b) illustrate a discrete-bit magnetic recording medium that can be used in each of the embodiments.

FIGS. 21(a) and 21(b) are schematic views showing another example of a magnetic recording medium that can be used in each of the above described embodiments. The magnetic recording medium 201 in this specific example is a discrete bit magnetic recording medium that has magnetic discrete bits 288 separated from one another by a nonmagnetic portion 287. When this medium 201 is rotated by the spindle motor 204 and is moved in the medium running direction 285, recorded magnetized portions 284 can be formed by the magnetic recording head 205 mounted onto the head slider 203.

As shown in FIGS. 20(a) through 21(b), with any of the magnetic heads of the above described embodiments, recording can be accurately performed on the recording layer with high coercivity on the magnetic recording medium 201 of a discrete type. Thus, high-density and high-speed magnetic recording can be performed.

In this specific example, the width (TS) of the spin oscillator in the recording track width direction is made equal to or greater than the width (TW) of each of the recording tracks 286, and is made equal to or smaller than the recording track pitch (TP), so that a decrease in the coercivity of the adjacent recording tracks due to the leakage high-frequency magnetic field generated from the spin oscillator can be largely restricted. Accordingly, microwave assisted magnetic recording can be performed effectively only on desired recording tracks 286. With this embodiment, there is a possibility that a microwave assisted magnetic recording medium with a recording density of 10 Tbits/inch$^2$ or higher can be realized by giving high magnetic anisotropic energy (Ku) to the magnetic dots 288 and reducing the size of the magnetic dots 288, as long as the resistance to thermal fluctuations is maintained in the usage environment.

It is particularly preferable that a so-called ECC (exchange composite) medium is used as a magnetic recording medium in any of the magnetic heads of the respective embodiments of the present invention. The ECC medium includes a magnetic recording layer that is made of a hard magnetic material, and a soft magnetic layer that is made of a soft magnetic material and is adjacent to the magnetic recording layer. The soft magnetic material is preferably a FeSiO alloy or a NiFe alloy. The hard magnetic material is preferably a material that is generally used for vertical magnetic recording, such as a CoPtCr—SiO$_2$ alloy or a FePt alloy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A magnetic head comprising:
   first and second main magnetic poles; and
   a spin torque oscillator provided between the first and second main magnetic poles, wherein:
   the spin torque oscillator has a stacked structure including a first magnetic layer, an intermediate layer, a second magnetic layer, and a third magnetic layer stacked in this order;
   the first main magnetic pole is placed on the opposite side of the first magnetic layer from the intermediate layer; and
   the second main magnetic pole is placed on the opposite side of the third magnetic layer from the second magnetic layer.

2. The head according to claim 1, wherein the third magnetic layer is an antiferromagnetic material.

3. The head according to claim 1, wherein:
   the direction of each axis of easy magnetization of the first magnetic layer and the third magnetic layer is substantially perpendicular to a film plane of the stacked structure; and when a driving current is not flowing into the spin torque oscillator, magnetization directions of the first magnetic layer and the third magnetic layer are substantially opposite from each other.

4. The head according to claim 1, wherein:
the direction of each axis of easy magnetization of the first magnetic layer and the third magnetic layer is substantially perpendicular to a film plane of the stacked structure; and
when a driving current is not flowing into the spin torque oscillator, magnetization directions of the first magnetic layer and the third magnetic layer are substantially the same as each other.

5. The head according to claim 1, wherein magnetic directions of the first through third magnetic layers are substantially parallel to a film plane of the stacked structure.

6. A magnetic recording device comprising the magnetic head according to claim 1,
wherein writing on a magnetic recording medium is performed with the use of the magnetic head.

7. The device according to claim 6, wherein the magnetic recording medium includes a magnetic recording layer made of a hard magnetic material, and a soft magnetic layer made of a soft magnetic material, the soft magnetic layer being adjacent to the magnetic recording layer.

8. The device according to claim 6, wherein the magnetic recording medium is a discrete bit medium.

9. The device according to claim 6, wherein the magnetic recording medium is a discrete track medium.

10. A magnetic head comprising:
first and second main magnetic poles; and
a spin torque oscillator provided between the first and second main magnetic poles, wherein:
the spin torque oscillator has a stacked structure including a first magnetic layer, an intermediate layer, and a second magnetic layer stacked in this order;
the first main magnetic pole is placed on the opposite side of the first magnetic layer from the intermediate layer;
the second main magnetic pole is placed on the opposite side of the second magnetic layer from the intermediate layer; and
the spin torque oscillator further includes a pair of field applying units that are placed in a direction substantially orthogonal to a direction from the first main magnetic pole to the second main magnetic pole.

11. The head according to claim 10, wherein the spin torque oscillator further includes a third magnetic layer that is located on the opposite side of the second magnetic layer from the intermediate layer, and is in contact with the second magnetic layer.

12. The head according to claim 11, wherein the third magnetic layer is an antiferromagnetic material.

13. A magnetic head comprising:
first and second main magnetic poles; and
a spin torque oscillator provided between the first and second main magnetic poles,
wherein the first and second main magnetic poles serve as electrodes of the spin torque oscillator.

14. A magnetic head comprising:
first and second main magnetic poles; and
a spin torque oscillator provided between the first and second main magnetic poles, wherein:
the spin torque oscillator has a stacked structure including a first magnetic layer, an intermediate layer, a second magnetic layer, and a third magnetic layer stacked in this order;
the first main magnetic pole is placed to face one of two side faces of the spin torque oscillator which are parallel to a film plane of the stacked structure; and
the second main magnetic pole is placed to face the other one of the two side faces.

15. The head according to claim 14, wherein the third magnetic layer is an antiferromagnetic material.

16. The head according to claim 14, wherein:
the direction of each axis of easy magnetization of the first magnetic layer and the third magnetic layer is substantially perpendicular to the film plane of the stacked structure; and
when a driving current is not flowing into the spin torque oscillator, magnetization directions of the first magnetic layer and the third magnetic layer are substantially the same as each other.

17. The head according to claim 14, wherein:
the direction of each axis of easy magnetization of the first magnetic layer and the third magnetic layer is substantially perpendicular to the film plane of the stacked structure; and
a magnetization direction of the first magnetic layer is substantially the opposite direction from a magnetization direction of the third magnetic layer.

18. The head according to claim 14, wherein, when a current is not flowing into the spin torque oscillator, magnetic directions of the first through third magnetic layers are substantially parallel to the film plane of the stacked structure.

19. A magnetic head comprising:
first and second main magnetic poles; and
a spin torque oscillator provided between the first and second main magnetic poles, wherein:
the spin torque oscillator has a stacked structure including a first field applying unit, a first magnetic layer, an intermediate layer, a second magnetic layer, and a second field applying unit stacked in this order;
the first main magnetic pole is placed to face one of two side faces of the spin torque oscillator which are orthogonal to a film plane of the stacked structure; and
the second main magnetic pole is placed to face the other one of the two side faces.

20. The head according to claim 19, wherein the spin torque oscillator further includes a third magnetic layer that is located between the second magnetic layer and the second field applying unit.

21. The head according to claim 20, wherein the third magnetic layer is an antiferromagnetic material.

* * * * *